US011879033B2

(12) United States Patent
Kohl et al.

(10) Patent No.: US 11,879,033 B2
(45) Date of Patent: Jan. 23, 2024

(54) POLYCYLOOLEFINIC POLYMERS AND ANION EXCHANGE MEMBRANES DERIVED THEREFROM

(71) Applicants: PROMERUS, LLC, Akron, OH (US); GEORGIA TECH RESEARCH CORPORATION, Atlanta, GA (US)

(72) Inventors: Paul A Kohl, Atlanta, GA (US); Mrinmay Mandal, Atlanta, GA (US); Matthew L Barchok, Akron, OH (US); Doug Skilskyj, Akron, OH (US); Larry F Rhodes, Akron, OH (US)

(73) Assignees: PROMERUS, LLC, Akron, OH (US); GEORGIA TECH RESEARCH CORPORATION, Atlanta, GA (US)

( * ) Notice: Subject to any disclaimer, the term of this patent is extended or adjusted under 35 U.S.C. 154(b) by 320 days.

(21) Appl. No.: 17/389,593

(22) Filed: Jul. 30, 2021

(65) Prior Publication Data
US 2022/0033571 A1   Feb. 3, 2022

Related U.S. Application Data

(60) Provisional application No. 63/058,738, filed on Jul. 30, 2020.

(51) Int. Cl.
*C08G 61/02* (2006.01)
*C08G 61/12* (2006.01)
(Continued)

(52) U.S. Cl.
CPC ............... *C08G 61/02* (2013.01); *B01J 41/13* (2017.01); *C08G 61/125* (2013.01);
(Continued)

(58) Field of Classification Search
CPC ............... C08G 61/02; C08G 2261/76; C08G 2261/11; C08G 2261/146;
(Continued)

(56) References Cited

U.S. PATENT DOCUMENTS

2011/0143260 A1   6/2011   Bell et al.

FOREIGN PATENT DOCUMENTS

WO   WO 2019-191225 A1   10/2019

OTHER PUBLICATIONS

Mandal, M. et al., "Highly conductive anion-exchange membranes based on cross-linked poly (norbornene): vinyl addition polymerization," ACS Applied Energy Materials, 2019, vol. 2, No. 4, pp. 2447-2457.
(Continued)

*Primary Examiner* — Fred M Teskin
(74) *Attorney, Agent, or Firm* — Balaram Gupta

(57) ABSTRACT

Embodiments in accordance with the present invention encompass a variety of polymers derived from polycyclic olefin monomers, such as hydrocarbon functionalized norbornenes. The polymers so formed function as ionomers and are suitable as anion exchange membrane for fabricating a variety of electrochemical devices, among others. More specifically, the ionomeric polymers used herein are derived from a variety of quaternized amino functionalized norbornene monomers and are lightly crosslinked (less than ten mol %). The membranes made therefrom exhibit very high ionic conductivity of up to 198 mS/cm at 80° C. This invention also relates to using an anion conducting solid polymer electrolyte as the ion conducting medium between the two electrodes and the ion conducting medium within the electrodes acting as the ionic conduit between electro-
(Continued)

active material and electrolyte. The electrochemical devices made in accordance of this invention are useful as fuel cells, gas separators, and the like.

19 Claims, 3 Drawing Sheets

(51) Int. Cl.
    *C08F 8/32*           (2006.01)
    *H01M 8/1004*     (2016.01)
    *H01M 50/414*     (2021.01)
    *B01J 41/13*       (2017.01)

(52) U.S. Cl.
    CPC ....... *H01M 8/1004* (2013.01); *H01M 50/414* (2021.01); *C08G 2261/11* (2013.01); *C08G 2261/12* (2013.01); *C08G 2261/146* (2013.01); *C08G 2261/148* (2013.01); *C08G 2261/1412* (2013.01); *C08G 2261/1644* (2013.01); *C08G 2261/3242* (2013.01); *C08G 2261/3324* (2013.01); *C08G 2261/3325* (2013.01); *C08G 2261/76* (2013.01)

(58) Field of Classification Search
    CPC ...... C08G 2261/122; C08G 2261/3324; C08G 2261/3325; B01J 41/13; C08F 32/04; C08F 32/08; C08F 8/32
    USPC ............................................. 521/27; 526/281
    See application file for complete search history.

(56) References Cited

OTHER PUBLICATIONS

Mandal, M. et al., "The importance of water transport in high conductivity and high-power alkaline fuel cells," Journal of The Electrochemcial Society, 2020, vol. 167, No. 5, Article No. 054501, internal pp. 1-12.

Chen, W. et al., "Highly conducting anion-exchange membranes based on cross-linked poly (norbornene): ring opening metathesis polymerization," ACS Applied Energy Materials, 2019, vol. 2, No. 4, pp. 2458-2468.

Mandal, M. et al., "Poly(norbornene) anion conductive membranes: homopolymer, block copolymer and randon copolymer properties and performance," Jornal of Materials Chemistry A, Aug. 13, 2020, vol. 8, No. 34, pp. 17568-17578.

Written Opinion of PCT/US2021/043839, dated Nov. 19, 2021.

POLYCYLOOLEFINIC POLYMERS AND ANION EXCHANGE MEMBRANES DERIVED THEREFROM

CROSS REFERENCE TO RELATED APPLICATIONS

This application claims the benefit of U.S. Provisional Application No. 63/058,738, filed Jul. 30, 2020, which is incorporated herein by reference in its entirety.

BACKGROUND OF THE INVENTION

Field of the Invention

The present invention relates to a series of polycycloolefinic polymers, which function as ionomers and are suitable as anion exchange membrane for fabricating a variety of electrochemical and separations devices. More specifically, the ionomeric polymers used herein are derived from a variety of functionalized norbornene monomers. This invention also relates to using an anion conducting solid polymer electrolyte as the ion conducting medium between the two electrodes and the ion conducting medium within the electrodes acting as the ionic conduit between electroactive material and electrolyte. The anion conducting solid polymer electrolyte may also be used as one part of a bipolar membrane when paired with a cation conducting portion. The electrochemical devices made in accordance of this invention are useful as fuel cells, gas separators, redox flow batteries, hydrogen producing water electrolysis devices and the like.

Description of the Art

Energy conversion devices using solid polymer electrolytes such as fuel cells, electrolyzers to produce hydrogen from water and for separations are promising options because of their simplicity, high thermodynamic efficiency and solid-state design. See for example, B. C. H. Steele and A. Heinzel, Nature, 2001, 414, 345. These devices are also scalable and can be used for transportation, remote and distributed power, small and large scale facilities for electricity and hydrogen production, and for separating specific chemical, such as carbon dioxide, oxygen or hydrogen. More importantly, fuel cells are a clean energy conversion technology with the potential to reduce the use of fossil fuels. More specifically, fuel cells can be used in stationary power generation, portable electronics, and transportation. In addition, fuel cells are environmentally friendly, can be easy to refuel, and can have high energy conversion efficiency.

Various solid polymer electrolytes in the form of membranes are used in such energy conversion and separation devices. There are at least two broad categories of polymer electrolyte membranes, namely, proton (or cation) exchange membranes (PEMs) and anion exchange membranes (AEMs). An advantageous attributes of AEMs or PEMs include simplicity in fabrication of electrodes with a three-phase boundary because liquid/gas pressures do not have to be balanced like in liquid electrolyte devices. AEM and PEM materials can be combined together to form a bipolar membranes, which are particularly useful in separation devices and some energy conversion devices. Although there are a few commercial fuel cell electric vehicles and stationary power generators based on PEM membranes, they are still economically less attractive as they employ platinum-based electrocatalysts and perfluorinated polymer membranes.

High pH AEMs have facile oxygen reaction kinetics compared to acid conducting PEMs and offer the opportunity to use non-precious metal catalysts, and reduced fuel crossover. However, early membranes suffered from low ion conductivity, poor chemical stability at high pH, and high water-uptake. More recently, higher conductivity (e.g. 100 mS/cm at 80° C.) and chemical stability (80° C. in 1 M NaOH) has been achieved by a number of researchers, as reviewed by Arges. See, Arges et al., ACS Appl. Energy Mater. 2018, 1, 2991-3012. This notable progress has shown that certain structural moieties can be used to address pervious AEM deficiencies.

Electrolyzers producing hydrogen from water are an emerging enabling technology for the hydrogen economy. Electrochemical separations can enrich or deplete gas or liquid feed streams of chemical species, such as carbon dioxide, oxygen and hydrogen. AEM-based devices have the potential to lower the cost of ownership of these devices compared to PEM-based devices because the anionic environment, especially high pH environment using hydroxide ions as the electroactive ion, is advantageous for the oxygen reduction reaction (ORR), oxygen evolution reaction (OER) kinetics, enabling the use of non-platinum catalysts. See for example, D. R. Dekel, Journal of Power Sources, 2018, 375, 158-169.

Bipolar membranes can be used in fuel cell and electrolyzer applications where it is advantageous to have one electrode operate at high pH (i.e., the AEM side) and the other electrode operate at low pH (i.e., the PEM side). Separation devices, such as salt splitting, can use AEM, PEM and bipolar membranes in a variety of configurations. There is a particular need for high conductivity and chemical stability (i.e., ability to operate at high pH on the AEM side). See for example, "Electrodialysis and Water Reuse" A. Bernardes, M. Rodrigues and J. Ferreira Editors, Springer, ISBN 978-3-642-40249-4, NY (2014) and "Analysis of Factors Limiting the Use of Bipolar Membranes: A Simplified Model to Determine Trends", J. Hineste, G. Pourcelly, Y. Lorrain, F. Persin and C. Gavach, Journal of Membrane Science, 112 (1996) 199-208.

In addition, a variety of low-cost monomers can be used to synthesize hydrocarbon-based anion or hydroxide ion conducting polymers that are stable in alkaline conditions, compared to the perfluorinated polymers needed for PEM-based electrochemical devices. See for example, P. A. Kohl, et al., Energy & Environmental Science, 2014, 7, 3135-3191. Furthermore, perfluorinated polymers are expensive and dangerous to manufacture, and present significant hazards due to monomer reactivity.

However, a majority of AEMs currently available do not meet the stringent property requirement of an ideal AEM or bipolar membrane, which include among others the following: (i) high anion (e.g. hydroxide) conductivity, (ii) long-term alkaline stability at the AEM device operating temperature, (iii) robust mechanical properties for withstanding in-use pressure differences and avoiding polymer creep under compression, and (iv) control over excessive water uptake, which can disrupt ion transport within the electrodes and membrane. See for example, S. Gottesfeld, et al., Journal of Power Sources, 2018, 375, 170-184.

It should further be noted that the structure of the polymer backbone, the position of the cations in the polymer architecture and the nature of the cations determine the conductivity and long-term alkaline stability of AEMs. Polymer backbones containing polysulfone, polyketone and poly (aryl ether) moieties are susceptible to hydroxide attack and polymer backbone degradation, and therefore are not suitable for forming AEMs. See for example, Zhang, X., et al., Polym. Chem. 2018, 9, 699-711 (block poly(arylene ether sulfone) copolymers as AEMs); and Akiyama, R., et al., Macromolecules 2016, 49, 4480-4489 (aromatic copolymers from dimethylaminomethylated monomers).

A few of the AEMs reported in the art exhibit conductivity of over 100 mS/cm (60° C. to 80° C.) and some report AEMs having conductivity at or near 200 mS/cm at 80° C. See for example, P. A. Kohl, et al., Journal of Materials Chemistry A, 2016, 4, 16233-16244; and L. Zhu, T. J. Zimudzi, N. Li, J. Pan, B. Lin and M. A. Hickner, Polymer Chemistry, 2016, 7, 2464-2475.

It has been found that polymer backbones in a block copolymer (BCP) architecture form efficient ion-conducting channels and lead to high ionic conductivity. See, for example, P. A. Kohl, et al., J. Electrochem. Soc., 2020, 167, 054501. However, synthesizing BCP architectures is more difficult, expensive and restrictive than synthesizing random copolymers especially on an industrial scale.

In view of the foregoing, there is still a need to develop AEMs that exhibit not only high conductivity but also a combination of better properties including mechanical properties and long term stability as stated above.

Accordingly, it is an object of this invention to provide a series of polycycloolefinic polymers suitable for the fabrication of AEMs and/or bipolar membranes exhibiting such improved properties.

It is also an object of this invention to provide processes for the preparation of the polymers and AEMs as disclosed herein.

Other objects and further scope of the applicability of the present invention will become apparent from the detailed description that follows.

SUMMARY OF THE INVENTION

Surprisingly, it has now been found that a random copolymer derived from a monomer of formula (I) and formula (II) as described herein provide for forming an anion exchange membrane which exhibits hitherto unattainable properties. More specifically, a vinyl addition copolymer containing repeat units derived a monomer of formula (I) and a monomer of formula (II), where X is quaternized ammonium moiety of formula $NR_5R_6R_7{}^+OH^-$ and wherein a portion of the repeat units of formula (I) are crosslinked with each other produces a polymer which can be fabricated into a membrane that exhibits low water uptake. The membranes thus formed also exhibit high ionic conductivity of up to 200 mS/cm at 80° C. and are stable for a long period of time of up to 1,000 hours or longer in 1 M sodium hydroxide solution at 80° C., and therefore, are suitable as chemically very stable anion exchange membranes (AEM). In some embodiments the polymer employed is a homopolymer derived from a monomer of formula (I) as described herein. The membranes formed from the copolymers comprising all hydrocarbon backbone of this invention also exhibit a very high ion-exchange capacity (IEC) from about 3 meq/g to about 4 meq/g or higher. Therefore, the membranes in accordance with this invention are useful in a variety of applications including electrochemical devices, such as AEM fuel cells, electrolyzers, among others.

DETAILED DESCRIPTION OF THE INVENTION

Figure 1:
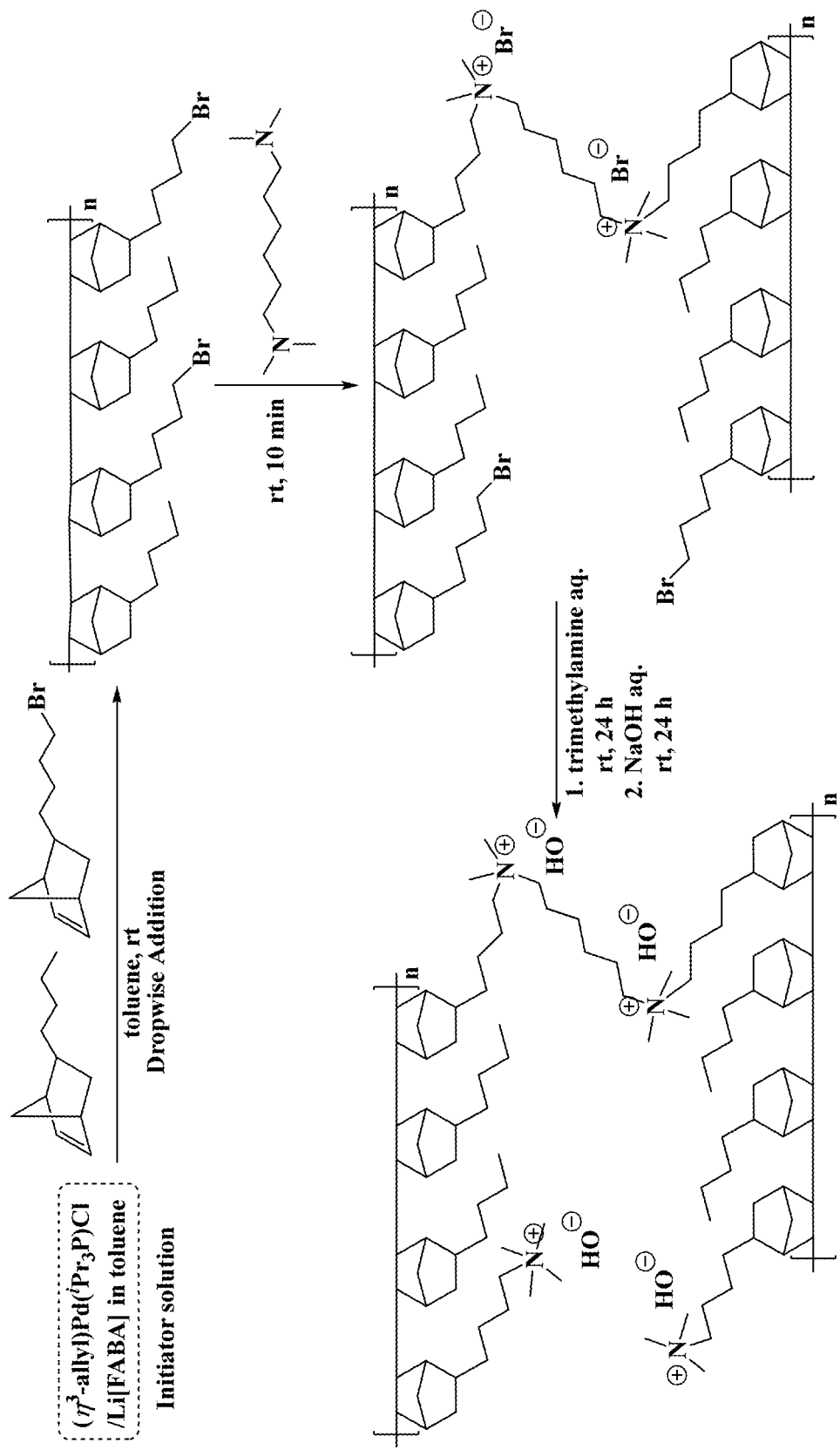
FIG. 1 shows a schematic depiction of the synthesis of cross-linked copolymers of this invention for forming anion exchange membranes (AEMs) of this invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl and hexenyl groups. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chlorine or chloro, fluorine or fluoro, bromine or bromo, and iodine or iodo.

As used herein, the expression "ionomer" means an anion conducting solid polymer electrolyte as the ion conducting medium between the two electrodes and the ion conducting medium within the electrodes acting as the ionic conduit between electroactive material and electrolyte.

In a broad sense, the term "substituted" is contemplated to include all permissible substituents of organic compounds. In a few of the specific embodiments as disclosed herein, the term "substituted" means substituted with one or more substituents independently selected from the group consisting of $C_{1-6}$alkyl, $C_{2-6}$alkenyl, $C_{1-6}$perfluoroalkyl, phenyl, hydroxy, —$CO_2H$, an ester, an amide, $C_1$-$C_6$alkoxy, $C_1$-$C_6$thioalkyl, $C_1$-$C_6$perfluoroalkoxy, —$NH_2$, Cl, Br, I, F, —NH-lower alkyl, and —N(lower alkyl)$_2$. However, any of the other suitable substituents known to one skilled in the art can also be used in these embodiments.

By the term "derived" is meant that the polymeric repeating units are polymerized (formed) from, for example, polycyclic norbornene-type monomers in accordance with formulae (I) and/or (II) wherein the resulting polymers are formed by 2,3 enchainment of norbornene-type monomers as shown below:

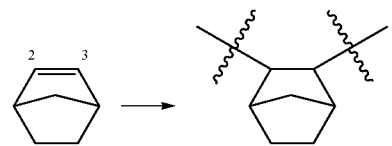

The above polymerization is also known widely as vinyl addition polymerization typically carried out in the presence of organometallic compounds such as organopalladium compounds or organonickel compounds as further described in detail below.

Thus, in accordance with the practice of this invention there is provided a polymer comprising:
a) one or more first repeating unit of formula (IA) derived from a monomer of formula (I):

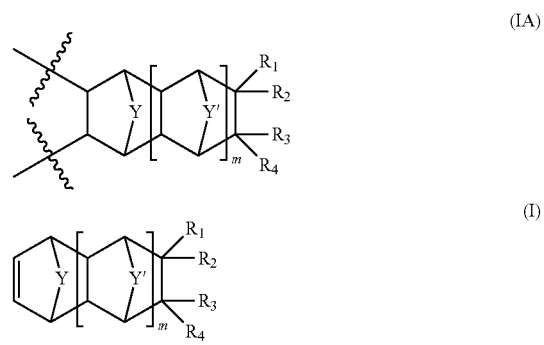

wherein:
~~~ represents a position at which the bonding takes place with another repeat unit;
Y and Y' are the same or different and independently of each other selected from the group consisting of —$CH_2$—, —$CH_2$—$CH_2$— and —O—;
m is an integer from 0 to 3;
at least one of $R_1$, $R_2$, $R_3$ or $R_4$ is a group of the formula R—X,
where R is selected from the group consisting of ($C_1$-$C_{10}$)alkylene, ($C_3$-$C_8$)cycloalkylene, ($C_1$-$C_{10}$)alkylene($C_3$-$C_8$)cycloalkylene, ($C_1$-$C_{10}$)alkylene($C_3$-$C_8$)cycloalkylene($C_1$-$C_{10}$)alkylene, ($C_1$-$C_{10}$)alkylene($C_6$-$C_{10}$)arylene and ($C_1$-$C_{10}$)alkylene($C_6$-$C_{10}$)arylene($C_1$-$C_{10}$)alkylene; and
X is halogen or a group of the formula N($R_5$)($R_6$)($R_7$) $^{\oplus}$OH$^{\ominus}$, where
at least one of $R_5$, $R_6$ and $R_7$ is selected from the group consisting of: ($C_1$-$C_{10}$)alkyleneN($R_{5'}$)($R_{6'}$), ($C_3$-$C_8$)cycloalkyleneN($R_{5'}$)($R_{6'}$), ($C_1$-$C_{10}$)alkylene($C_3$-$C_8$)cycloalkyleneN($R_{5'}$)($R_{6'}$), ($C_1$-$C_{10}$)alkylene($C_3$-$C_8$)cycloalkylene($C_1$-$C_{10}$)alkyleneN($R_{5'}$)($R_{6'}$), ($C_1$-$C_{10}$)

alkylene($C_6$-$C_{10}$)aryleneN($R_{5'}$)($R_{6'}$) and ($C_1$-$C_{10}$)alkylene($C_6$-$C_{10}$)arylene($C_1$-$C_{10}$)alkyleneN($R_{5'}$)($R_{6'}$);

$R_{5'}$ and $R_{6'}$ are the same or different and independently of each other selected from the group consisting of linear or branched ($C_1$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl;

the remaining $R_5$, $R_6$ and $R_7$ are the same or different and independently of each other selected from the group consisting of linear or branched ($C_1$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl; and the remaining $R_1$, $R_2$, $R_3$ and $R_4$ are independently of each other selected from the group consisting of hydrogen, linear or branched ($C_1$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl;

b) one or more second repeating unit of formula (IIA) derived from a monomer of formula (II):

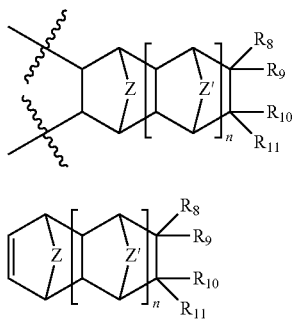

wherein:

⌇⌇ represents a position at which the bonding takes place with another repeat unit;

Z and Z' are the same or different and independently of each other selected from the group consisting of —$CH_2$—, —$CH_2$—$CH_2$— and —O—;

n is an integer from 0 to 3; and $R_8$, $R_9$, $R_{10}$ and $R_{11}$ are the same or different and independently of each other selected from the group consisting of hydrogen, linear or branched ($C_1$-$C_{10}$)alkyl, ($C_3$-$C_8$)cycloalkyl, ($C_1$-$C_{10}$)alkyl($C_3$-$C_8$)cycloalkyl and ($C_1$-$C_{10}$)alkyl($C_6$-$C_{10}$)aryl; and wherein the first repeat unit is crosslinked with another first repeat unit on the same or different polymer chains when X is $NR_5R_6R_7^{\oplus}$ $OH^{\ominus}$ such that the polymer has at least two percent of the available sites reacted between the repeat units and exhibits ion conductivity of at least 150 mS/cm at 80° C. It is further noted that not all crosslinks occur inter-molecular (i.e., between two different polymer chains). Some crosslinks can occur intra-molecular (i.e., between two cross-linkable sites on the same polymer chain). Statistically, this can happen and all such combinations are part of this invention.

That is to say that the polymer of this invention where X is halogen is reacted with a multifunctional amino compound as further described in detail below to form a cross-linked polymer, which is crosslinked either intramolecularly or intermolecularly. For example, when the multifunctional amino compound is a bis-functional amine, then two of the repeat units of formula (IA) are bound together with such bis-amine. This can happen either within the same polymer chain, i.e., intramolecular crosslinking or between two polymeric chains, i.e., intermolecular crosslinking.

It should further be noted that in some embodiments the polymer of this invention may contain only one or more first repeating unit of formula (IA) derived from a monomer of formula (I) as described herein. In yet some embodiments of this invention the polymer is a homopolymer containing only one repeating unit of formula (IA) derived from a monomer of formula (I) as described herein. In yet another embodiment of this invention, the monomer of formula (II) can be replaced by an unsaturated hydrocarbyl substituted organic compound which is polymerizable with monomer of formula (I), such as for example, ethylene, butadiene or styrene, among others, as further described in detail below.

Advantageously, it has now been found that a copolymer containing a proper combination of a monomer of formula (I) and a monomer of formula (II) it is now possible to prepare a cross-linked polymer which exhibits much needed properties in fabricating a membrane in accordance with this invention as further described below.

Accordingly, in some embodiments the polymer according to this invention encompasses:

m and n are 0 or 1;

each of Y, Y', Z and Z' is $CH_2$;

at least one of $R_1$, $R_2$, $R_3$ and $R_4$ is a group of formula R—X, where

R is $(CH_2)_a$, $(CH_2)_a$cyclohexylene, $(CH_2)_a$cyclohexylene$(CH_2)_a$, $(CH_2)_a$phenylene, and $(CH_2)_a$phenylene$(CH_2)_a$, where a is an integer from 1 to 10;

X is bromine or a group of the formula $N(R_5)(R_6)(R_7)^{\oplus}OH^{\ominus}$, where at least one of $R_5$, $R_6$ and $R_7$ is selected from the group consisting of: $(CH_2)_aNR_{5'}R_{6'}$, $(CH_2)_a$cyclohexyleneNR$_{5'}$R$_{6'}$, $(CH_2)_a$cyclohexylene$(CH_2)_a$NR$_{5'}$R$_{6'}$, $(CH_2)_a$phenyleneNR$_{5'}$R$_{6'}$, and $(CH_2)_a$phenylene$(CH_2)_a$NR$_{5'}$R$_{6'}$, where a is an integer from 1 to 10;

$R_{5'}$ and $R_{6'}$ are the same or different and independently of each other selected from the group consisting of methyl, ethyl, linear or branched propyl, butyl pentyl, hexyl, cyclopentyl, cyclohexyl, methylcyclopentyl, methylcyclohexyl and benzyl;

the remaining $R_5$, $R_6$ and $R_7$ are the same or different and independently of each other selected from the group consisting of methyl, ethyl, linear or branched propyl, butyl pentyl, hexyl, cyclopentyl, cyclohexyl, methylcyclopentyl, methylcyclohexyl and benzyl;

the remaining $R_1$, $R_2$, $R_3$ and $R_4$ are independently of each other selected from the group consisting of hydrogen, methyl, ethyl, linear or branched propyl, butyl pentyl, hexyl, cyclopentyl, cyclohexyl, methylcyclopentyl, methylcyclohexyl and benzyl; and $R_8$, $R_9$, $R_{10}$ and $R_{11}$ are independently of each other selected from the group consisting of hydrogen, methyl, ethyl, linear or branched propyl, butyl pentyl, hexyl, cyclopentyl, cyclohexyl, methylcyclopentyl, methylcyclohexyl and benzyl.

In yet some other embodiments the polymer according to this invention encompasses, where the first repeat unit is crosslinked with another first repeat unit or the second repeat unit when X is $NR_5R_6R_7^{\oplus}$ $OH^{\ominus}$ such that the polymer is having a crosslinking between the repeat units of two percent or more to ten percent or less. In some other embodiments such crosslinking is three percent or more, four percent or more, five percent or more, six percent or more, seven percent or more, eight percent or more and nine percent or more. In some embodiments such crosslinking maybe more than ten percent or even more than twenty percent depending upon the intended benefit.

In yet some other embodiments the polymer according to this invention encompasses, where the first repeat unit is crosslinked with another first repeat unit or the second repeat unit when X is $NR_5R_6R_7^\oplus \ OH^\ominus$ such that the polymer is having a crosslinking of at least five percent between the repeat units.

In yet some other embodiments the polymer according to this invention exhibits ion conductivity from about 160 mS/cm to about 200 mS/cm at a temperature from about 30° C. to about 100° C.

Generally, the polymer according to this invention is a copolymer which can be a random copolymer containing one first repeat unit of formula (IA) derived from a monomer of formula (I) and one second repeat unit of formula (IIA) derived from a monomer of formula (II). However, as noted above, the polymer of this invention can also be a homopolymer containing only the first repeat unit of formula (IA) derived from a monomer of formula (I) as described herein.

It should further be noted that the monomers of formulae (I) and (II) generally contain a hydrocarbyl side chain group except that the monomer of formula (I) contains a hydrocarbyl group substituted with a halogen atom, such as bromine, as described herein. The hydrocarbyl side chains impart hydrophobic regions across the polymeric backbone making them suitable for making the membranes of this invention. Accordingly, any of the olefinic monomers which impart such hydrophobic regions can be employed as olefinic monomers to form the polymers of this invention. Accordingly, in some embodiments the olefinic monomers employed are various known hydrocarbyl substitutes olefins, such as for example styrene and substituted styrene monomers. In this aspect of the invention, the polymers may contain additionally such hydrocarbyl olefinic monomers along with one or more monomers of formulae (I) and/or (II). In some other embodiments the polymer of this invention contains at least one repeat unit of formula (IA) derived from a monomer of formula (I) and at least one suitable styrenic monomer. The polymers so formed can still be crosslinked using the bromo (or halo) functional group contained in the repeat unit of formula (IA).

Various monomers of formulae (I) and (II) as described herein are known in the literature or can be readily synthesized by any of the procedures known to one skilled in the art. See for instance, U.S. Pat. Nos. 6,825,307 and 9,468,890, pertinent portions of which are incorporated herein by reference. Similarly, the polymers of this invention can be made by any of the known methods in the art. For instance, polymerization of various norbornene-type monomers is disclosed in U.S. Pat. Nos. 5,929,181; 6,455,650; 6,825,307; and 7,101,654, pertinent portions of which are incorporated herein by reference. In general, suitable methods for making the polymers of this invention include vinyl addition polymerization methods using organometallic compounds as catalysts, examples of which include organopalladium and organonickel compounds.

As noted, suitable polymers for forming the membranes of this invention are copolymers containing at least one monomer of formula (I) and one monomer of formula (II). Any of the molar ratio of monomers of formulae (I) or (II) that will bring about the intended benefit can be employed in making the polymers of this invention. Thus, in an embodiment of this invention the molar ratio of the first repeat unit and the second repeat unit is generally from about 1:99 to about 99:1. In another embodiment the molar ratio of first repeating unit to second repeating unit is from about 20:80 to about 80:20. In yet another embodiment the molar ratio of first repeating unit to second repeating unit is from about 40:60 to about 60:40. In another embodiment the molar ratio of first repeating unit to second repeating unit is from about 45:55 to about 55:45. In some other embodiments the molar ratio of first repeating unit to second repeating unit is 50:50.

It should further be noted that the polymer of this invention can contain more than two monomers. Accordingly, in some embodiments, the polymer of this invention is a terpolymer, i.e., it encompasses any three monomer repeat units as described herein, i.e., any three of the repeat units derived from monomers of formulae (I) and (II), which may include either two distinct monomers of formula (I) with a monomer of formula (II) or two distinct monomers of formula (II) with a monomer of formula (I). Further any molar ratios of the three monomers to form the terpolymer can be employed. For instance, such molar ratios can range from 98:1:1 to 1:98:1 to 1:1:98, i.e., any theoretically possible combination of ratios can be employed. In some of the embodiments the ratios range from 5:5:90 to 5:90:5 to 90:5:5; from 10:10:80 to 10:80:10 to 80:10:10, and so on.

In some embodiments more than three distinct monomers of formulae (I) and (II) can also be employed to make the polymers of this invention. Accordingly, in some embodiments the polymer of this invention maybe a tetrapolymer, pentapolymer, and so on. Again, any of the molar ratios of monomers that will bring about the desirable benefits to the resulting polymer can be employed.

The polymers formed according to this invention used to form membranes generally exhibit a number average molecular weight ($M_n$) of at least about 30,000. In another embodiment, the polymers used to make the anion exchange membranes (AEMs) has a $M_n$ of at least about 40,000. In yet another embodiment, the polymer used to make the AEMs has a $M_n$ of at least about 50,000. In yet another embodiment, the polymer used to make the AEMs has a $M_n$ of at least about 60,000. In yet another embodiment, the polymer used to make the AEMs has a $M_n$ of at least about 70,000. In yet another embodiment, the polymer used to make the AEMs has a $M_n$ of at least about 100,000 or 120,000. Generally, the larger the $M_n$, the more suitable the polymer is for use in supported or unsupported forms of the AEMs as further described herein. The $M_n$ of the polymers can be measured by any of the known methods such as by gel permeation chromatography (GPC) equipped with suitable detector and calibration standards, such as differential refractive index detector calibrated with narrow-distribution polystyrene standards. The polydispersity index ($PDI=M_w/M_n$) can then be measured, which is generally in the range of 1.1 to 3. The $M_w$ being the weight average molecular weight.

The polymers formed according to this invention are also used to form ionomers used in making the electrodes to go along with the membranes. Such polymers used in forming ionomers may exhibit lower number average molecular weight ($M_n$) and generally can exhibit an $M_n$ of at least about 1,000. However, $M_n$ higher than 1,000 can also be used as ionomers.

In one of the embodiments of this invention the polymer as described herein contains the first repeat unit of formula (IA), without any limitation, which is derived from a monomer of formula (I) selected from the group consisting of:

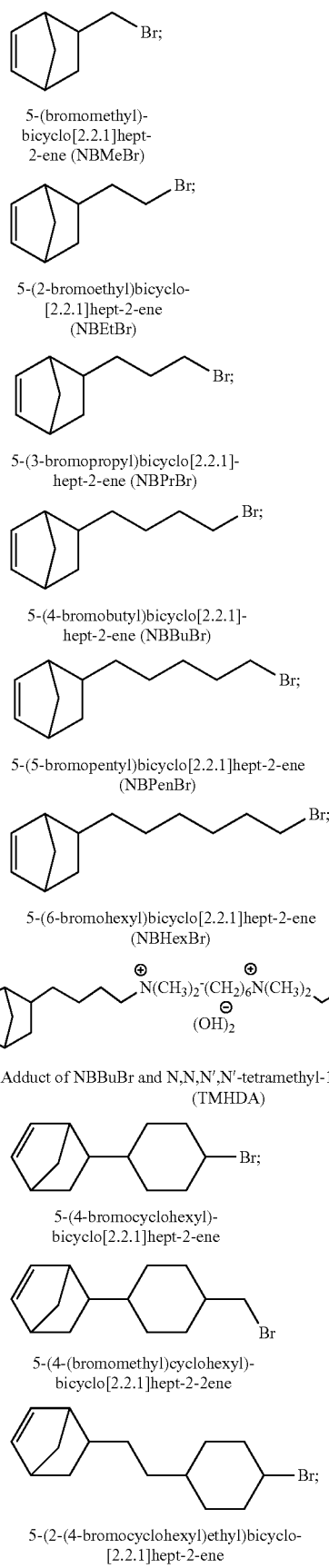
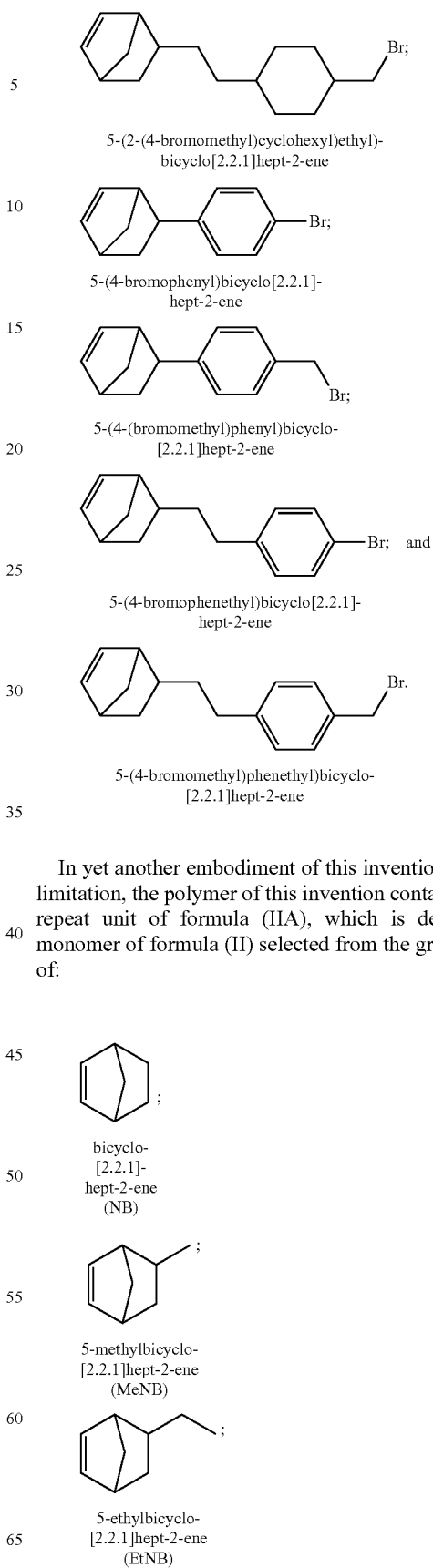
In yet another embodiment of this invention, without any limitation, the polymer of this invention contains the second repeat unit of formula (IIA), which is derived from a monomer of formula (II) selected from the group consisting of:

-continued

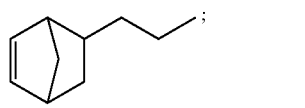
5-propylbicyclo[2.2.1]-
hept-2-ene (PrNB)

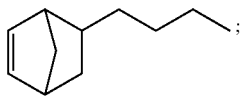
5-butylbicyclo[2.2.1]hept-2-ene
(BuNB)

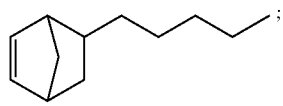
5-pentylbicyclo[2.2.1]hept-2-ene
(PenNB)

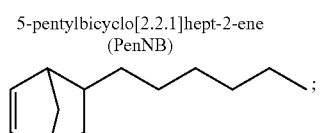
5-hexylbicyclo[2.2.1]hept-2-ene
(HexNB)

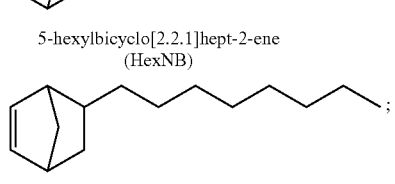
5-octylbicyclo[2.2.1]hept-2-ene (OctNB)

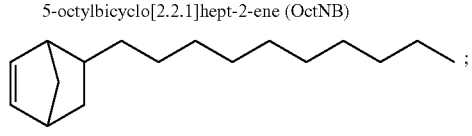
5-decylbicyclo[2.2.1]hept-2-ene (DecNB)

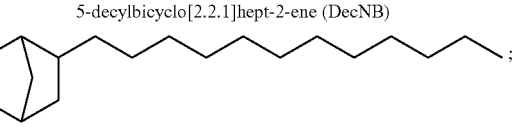
5-dodecylbicyclo[2.2.1]hept-2-ene (DoDecNB)

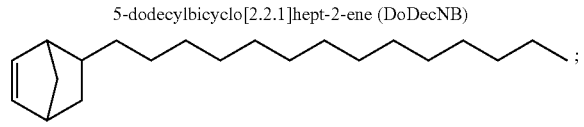
5-tetradecylbicyclo[2.2.1]hept-2-ene (TetraDecNB)

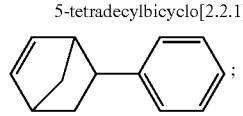
5-phenylbicyclo[2.2.1]-
hept-2-ene (PhNB)

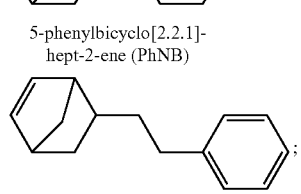
5-phenethylbicyclo[2.2.1]-
hept-2-ene (PENB)

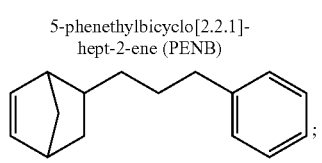
5-(3-phenylpropyl)bicyclo[2.2.1]-
hept-2-ene

-continued

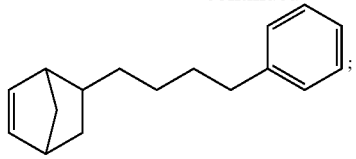
5-(4-phenylbutyl)bicyclo[2.2.1]hept-2-ene

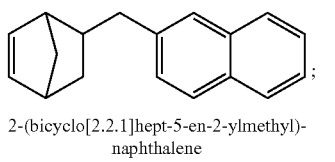
2-(bicyclo[2.2.1]hept-5-en-2-ylmethyl)-
naphthalene

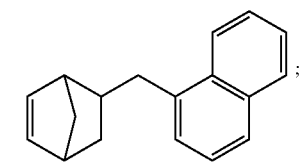
1-(bicyclo[2.2.1]hept-5-en-2-ylmethyl)-
naphthalene

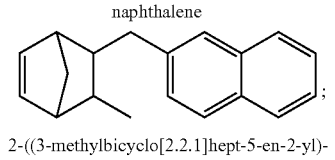
2-((3-methylbicyclo[2.2.1]hept-5-en-2-yl)-
methyl)naphthalene

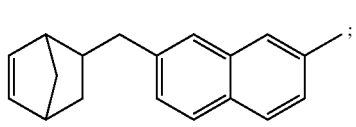
2-(bicyclo[2.2.1]hept-5-en-2-ylmethyl)-7-
methylnaphthalene

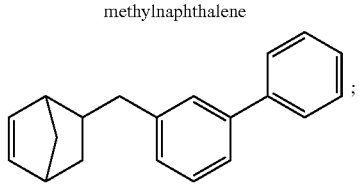
5-([1,1'-biphenyl]-3-ylmethyl)bicyclo-
[2.2.1]hept-2-ene

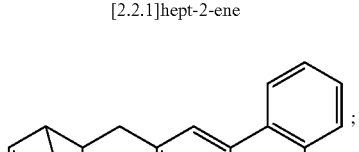
5-((2'-methyl-[1,1'-biphenyl]-3-yl)-
methyl)bicyclo[2.2.1]hept-2-ene

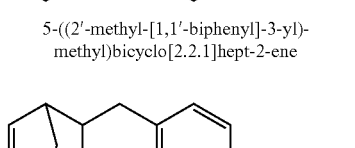
5-([1,1'-biphenyl]-4-ylmethyl)bicyclo-
[2.2.1]hept-2-ene

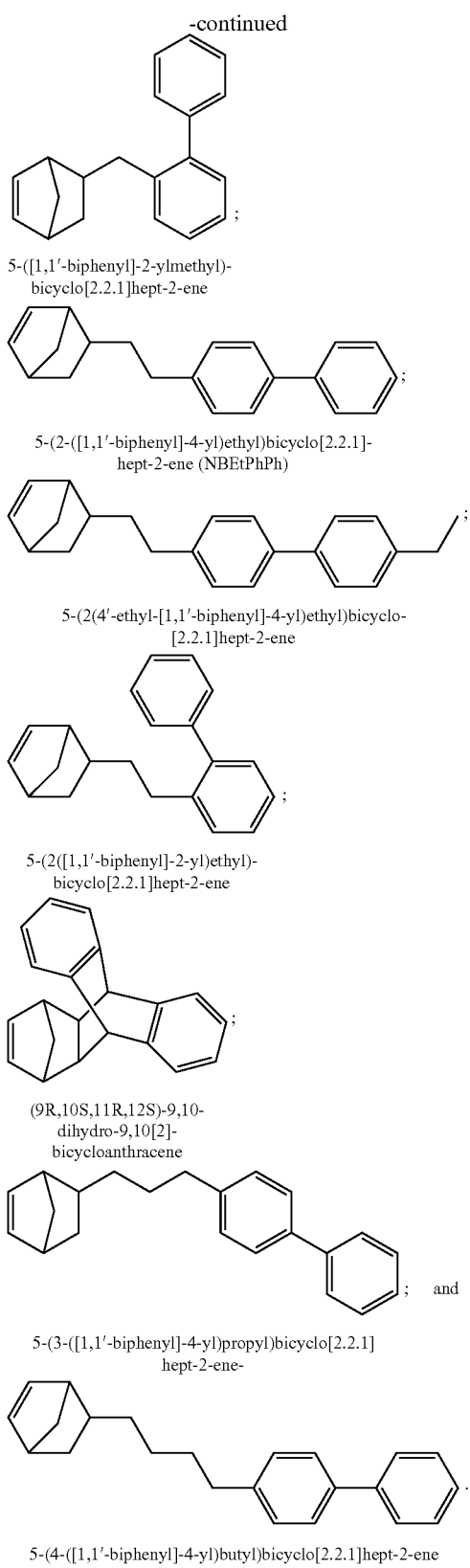

5-([1,1'-biphenyl]-2-ylmethyl)-bicyclo[2.2.1]hept-2-ene 5-(2-([1,1'-biphenyl]-4-yl)ethyl)bicyclo[2.2.1]-hept-2-ene (NBEtPhPh)

5-(2(4'-ethyl-[1,1'-biphenyl]-4-yl)ethyl)bicyclo-[2.2.1]hept-2-ene 5-(2([1,1'-biphenyl]-2-yl)ethyl)-bicyclo[2.2.1]hept-2-ene (9R,10S,11R,12S)-9,10-dihydro-9,10[2]-bicycloanthracene 5-(3-([1,1'-biphenyl]-4-yl)propyl)bicyclo[2.2.1]hept-2-ene- 5-(4-([1,1'-biphenyl]-4-yl)butyl)bicyclo[2.2.1]hept-2-ene Non-limiting examples of the polymer according to this invention is selected from the group consisting of:

a polymer formed from 5-(3-bromopropyl)bicyclo[2.2.1]hept-2-ene (NBPrBr) and norbornene (NB);

a polymer formed from 5-(4-bromobutyl)bicyclo[2.2.1]hept-2-ene (NBBuBr) and norbornene (NB);

a polymer formed from 5-(4-bromobutyl)bicyclo[2.2.1]hept-2-ene (NBBuBr), norbornene (NB), trimethylamine and N,N,N',N'-tetramethyl-1,6-hexanediamine (TMHDA);

a polymer formed from 5-(4-bromobutyl)bicyclo[2.2.1]hept-2-ene (NBBuBr) and 5-ethylbicyclo[2.2.1]hept-2-ene (EtNB);

a polymer formed from 5-(4-bromobutyl)bicyclo[2.2.1]hept-2-ene (NBBuBr) and 5-propylbicyclo[2.2.1]hept-2-ene (PrNB);

a polymer formed from 5-(4-bromobutyl)bicyclo[2.2.1]hept-2-ene (NBBuBr), 5-ethylbicyclo[2.2.1]hept-2-ene (EtNB), trimethylamine and N,N,N',N'-tetramethyl-1,6-hexanediamine (TMHDA);

a polymer formed from 5-(3-bromopropyl)bicyclo[2.2.1]hept-2-ene (NBPrBr) and 5-butylbicyclo[2.2.1]hept-2-ene (BuNB);

a polymer formed from 5-(4-bromopropyl)bicyclo[2.2.1]hept-2-ene (NBPrBr), 5-butylbicyclo[2.2.1]hept-2-ene (BuNB), trimethylamine and N,N,N',N'-tetramethyl-1,6-hexanediamine (TMHDA);

a polymer formed from 5-(4-bromobutyl)bicyclo[2.2.1]hept-2-ene (NBBuBr) and 5-butylbicyclo[2.2.1]hept-2-ene (BuNB);

a polymer formed from 5-(4-bromobutyl)bicyclo[2.2.1]hept-2-ene (NBBuBr), 5-butylbicyclo[2.2.1]hept-2-ene (BuNB), trimethylamine and N,N,N',N'-tetramethyl-1,6-hexanediamine (TMHDA);

a polymer formed from 5-(4-bromobutyl)bicyclo[2.2.1]hept-2-ene (NBBuBr) and 5-hexylbicyclo[2.2.1]hept-2-ene (HexNB); and a polymer formed from 5-(4-bromobutyl)bicyclo[2.2.1]hept-2-ene (NBBuBr), 5-hexylbicyclo[2.2.1]hept-2-ene (HexNB), trimethylamine and N,N,N',N'-tetramethyl-1,6-hexanediamine (TMHDA).

The polymers of this invention also exhibit very high glass transition temperatures ($T_g$), which can range from 250° C. to 400° C. Although the polymers of this invention containing flexible alkyl side chain may lower the $T_g$, it is possible to tailor the copolymers by appropriate selection of the monomers so as to exhibit $T_g$'s higher than 300° C. Surprisingly, it has now been found that certain of the polymers which are quaternized and cast into membranes exhibit no $T_g$ below 300° C. Thus, offering additional thermal property benefit for the membranes made in accordance of this invention. It should be noted that quaternary ammonium head-groups are known to break-down at or below 250° C., surprisingly that is not the case with the membranes of this invention containing such quaternary ammonium head-groups.

In another aspect of this invention there is provided an anion exchange membrane (AEM) comprising the polymer of this invention as described herein above. All of the embodiments of the polymer of this invention can be used to form the AEM or ionomer of this invention.

As noted, it has been a long sought need to find AEMs featuring long alkaline stability with high conductivity to achieve low ohmic resistance losses. Hydroxide conductivity is a function of the ion mobility and ion exchange capacity (IEC). The IEC of the AEM is often kept to a modest value in an effort to avoid high water uptake which can result in swelling of the membrane and low ion mobility. The mobility can be improved by the formation of efficient ion conducting channels (maybe by the use of block copolymers) and preventing excess water uptake within the membrane. Thus, membranes face the conundrum of striving to achieve high IEC but suffering the consequences that come from the water that the ions attract. Cross-linking can be used to address excess water uptake but often at the expense of low ion mobility.

It was believed that the phase segregation within block copolymers aids in the formation of hydrophobic and hydrophilic regions within the polymer. The quaternary ammonium head-groups within the hydrophilic phase is where hydroxide transport occurs. It is now evident that carbonate conductivity is very important in AEM (vs. hydroxide conductivity) because of the uptake of carbon dioxide from the ambient air. In a fuel cell, the carbon dioxide at the air cathode is readily absorbed and converts the hydroxide produced at the cathode to bicarbonate or carbonate. Once the bicarbonate or carbonate is transported to the hydrogen anode in a fuel cell, the evolved carbon dioxide will build-up within the recycled hydrogen fuel along with the water produced at the anode. Both carbon dioxide and water can diffuse back through the membrane continuing to process of hydroxide neutralization and carbonate migration. Fuel cell tests using fresh feed hydrogen avoid facing this critical issue of carbon dioxide build-up and carbonate conduction. Thus, it is imperative that the IEC and ion mobility be as high as possible for efficient carbonate conduction. Carbonate mobility is much lower than hydroxide mobility.

Further, AEM fuel cells operate at high pH using two electrodes: a negative electrode (also known as the anode) where hydrogen is oxidized and a positive electrode (also known as the cathode) where oxygen is reduced, as shown below.

| | |
|---|---|
| $2H_2O + O_2 + 4e^- \rightarrow 4OH^-$ | Positive electrode: |
| $4OH^- + 2H_2 \rightarrow 4H_2O + 4e^-$ | Negative electrode: |
| $O_2 + 2H_2 \rightarrow 2H_2O$ (plus energy produced) | Net reaction: |

In the fuel cell, oxygen or air is fed to the oxygen reduction reaction (ORR) positive electrode, and hydrogen gas is fed to the hydrogen oxidation reaction (HOR) negative electrode. Electrons pass through the external circuit to perform useful electrical work. It is known that these reactions are sensitive to the relative humidity of the fuel and oxidant streams, as well as the water uptake in the AEM and ionomer. Proper water management in the membrane and electrodes is critical to achieve high power density. Some of the water electrochemically generated at the HOR electrode is consumed at the cathode by the ORR in an AEM fuel cell. Water is transported from the cathode to the anode by electro-osmotic drag accompanying anion transport. Water also back diffuses from the anode to cathode. Without adequate water content within the membrane and electrodes, ionic conductivity suffers and polymer degradation accelerates due to the higher reactivity of hydroxide at lower water concentration. On the other hand, if there is too much water, catalyst layers can be easily flooded, and the efficient flow of ions within the electrodes and membranes can be disrupted. Mechanical degradation in the membrane can also occur due to the higher internal stress and expansion within the AEM.

Water electrolysis producing hydrogen gas and oxygen gas is the reverse reaction from the fuel cell, as shown below.

| | |
|---|---|
| $4OH^- \rightarrow H_2O + O_2 + 4e^-$ | Positive electrode: |
| $4H_2O + 4e^- \rightarrow 4OH^- + 2H_2$ | Negative electrode: |
| $2H_2O \rightarrow O_2 + 2H_2$ (energy is added) | Net reaction: |

In this case, liquid water can be fed to the positive electrode where the oxygen evolution reaction takes place (OER) and hydrogen gas is produced at the negative electrode (HER). It is most desirable to restrict the flow of hydrogen produced at the HER so its pressure is high. This avoids having to pressurize the hydrogen in a subsequent process. Thus, the membrane has to withstand significant differential pressure.

Similar electrochemical reactions can be used to separate specific species from in gas or liquid feed stream. The ORR and OER reactions can be used to make an oxygen pump.

| | |
|---|---|
| $4OH^- \rightarrow 2H_2O + O_2 + 4e^-$ | Positive electrode: |
| $2H_2O + O_2 + 4e^- \rightarrow 4OH^-$ | Negative electrode: |
| $O_2$ from negative electrode is moved to $O_2$ at positive electrode side. | Net reaction: |

Similar reactions can be used to separate carbon dioxide from an incoming gas stream by allowing the hydroxide ions to react with carbon dioxide producing carbonate.

| | |
|---|---|
| $2H_2O + O_2 + 4e^- \rightarrow 4OH^-$ | Negative electrode: |
| $4OH^- + 2CO_2 \rightarrow 2CO_3^{2-} + 2H_2O$ | |
| $2CO_3^{2-} \rightarrow 2CO_2 + O_2 + 4e^-$ | Positive electrode: |
| $CO_2$ from negative electrode is moved to $CO_2$ at positive electrode side. | Net reaction: |

In a similar way, hydrogen can be pumped from one gas stream to another by using the HER and HOR.

| | |
|---|---|
| $4OH^- + 2H_2 \rightarrow 4H_2O + 4e^-$ | Positive electrode: |
| $4H_2O + 4e^- \rightarrow 4OH^- + 2H_2$ | Negative electrode: |
| $H_2$ from positive electrode is moved to $H_2$ at negative electrode side. | Net reaction: |

In each of these reactions, anions are transported between the two electrodes. Efficient ion channels are needed in the AEM to achieve high conductivity because the number of ions cannot be independently increased (i.e. higher ion exchange capacity (IEC)) because of the penalty due to excessive water uptake. It has been shown that high mobility ion channels can be formed through the phase segregation obtained by the use of block copolymers (BCP). Nanochannels have been created through nanophase separation between hydrophobic and hydrophilic blocks of a BCP. It is important to note that not all BCP morphologies lead to high conductivity because the channels must also be interconnected for efficient ion conduction.

The nature of the polymer backbone and type/location of hydrophilic groups within the polymer is important for long term AEM stability at high pH. It has been experimentally shown that polar moieties, such as ether, ketone or ester linkages, within the polymer or side-groups, are susceptible to nucleophilic attack and backbone degradation. Positioning the cation head groups at the ends of pendant alkyl tether has also been found to be an effective strategy for mitigating polymer degradation. Quaternary ammonium head groups, especially the trimethyl ammonium cation, has been found to have an excellent balance of conductivity and stability, although other conducting groups show merit as well.

In addition to the membrane itself, ion conducting polymers are needed to form the electrodes. Electrodes are made in three-dimensional structures so that they have very high surface area. In a typical process, the electroactive catalyst is mixed with some of the anion conducting polymer to form an ink. The ink is then sprayed onto a gas diffusion layer (GDL) which also serves as the current collector. Two electrodes, which may be identical in composition or have different catalyst are then pressed onto the solid polymer membrane to make a membrane electrode assembly (MEA). The MEA is placed between solid blocks which help distribute the gases or liquids needed in the reaction.

High anion conductivity is critical for electrochemical devices using anion conducting membranes. When an electrical current passes through the external circuit of an electrochemical device, a corresponding ionic current must pass through the ionic membrane between the two electrodes in order to maintain charge balance within the device. The voltage drop across the ion conducting membrane is given by Ohm's law: the product of ionic current times the ionic resistance in the membrane. In an energy producing device, such as a fuel cell, the output voltage is the voltage difference between the two electrodes minus the voltage drop across the membrane. In a device which is driven by an external power supply, such in an electrochemical separator, the voltage drop across the membrane is an added input requirement, in addition to the voltage difference between the electrodes. Thus, maximizing the ionic conductivity of the membrane is important to the electrochemical device.

Membrane conductivity is the product of number of mobile ionic charge carriers within the membrane and mobility of the charge carriers. The concentration of ionic charge carriers can be expressed as equivalents of charge (i.e. moles of charge) per unit mass of polymer:ion exchange capacity (IEC) as measure in equivalents/gram (eq/g). As a practical matter, it has been found that the achievable IEC is limited by the amount of water uptake within the polymer. High water uptake causes excessive membrane swelling which lowers ion mobility and distorts other features of the device. The ion mobility depends on several factors including the tortuosity of ion pathway within the polymer. For example, Mandal et al. ACS Appl. Energy Mater. (2019), found that poly(norbornene) block copolymers formed high mobility ionic pathways. The hydrophobicity of the poly (norbornene) backbone mitigated water uptake. Block copolymers are known to self-assemble into hydrophilic and hydrophobic regions. Conductivities as high as 212 mS/cm at 80° C. have been demonstrated using poly(norbornene) block copolymers. Light cross-linking was also used to mitigate problems of excessive water uptake. Thus, high conductivity, efficient ion pathways can be formed using block copolymers.

One of the remaining challenges in the design of stable, high conductivity AEMs is water uptake. Excessive water uptake can occur at high IEC causing channel flooding and membrane swelling. This leads to mechanical distortion and softening of the membranes. Materials with high IEC tend to adsorb large quantities of water. Some water is needed to form the ion solvent-shell as well as dilution of the hydroxide salt within the membrane. The absorbed water must be adequate for ion solvation, however, excess free-water is not productive or desired. Thus, the water content can be divided into bound water (for forming the solvent shell) and free water. Hence, it is necessary to choose an IEC which balances the amount of free and bound water inside the membranes to yield maximum ion mobility (i.e. conductivity) while maintaining AEM mechanical properties.

For example, Chen et al., RSC Adv. 2015, 5, 63215-63225 reported that an AEM formed from a vinyl addition poly (norbornene) produced a very low conductivity (4 mS/cm at 80° C.) and showed a modest decline in conductivity after soaking in 6 M NaOH at room temperature. This AEM also exhibited low ion exchange capacity. It should further be noted that this polymer was not a block polymer and the head group tethers contained ether linkages which are known to be susceptible to hydroxide attack.

Advantageously it has now been found that crosslinking of the repeat units of the polymer backbone imparts unique properties to the membranes made therefrom. Accordingly, in this aspect of the invention there is provided a method for the formation of a membrane according to this invention comprising:

a) casting a film of a polymer according to claim 11, wherein X is bromine;

b) reacting the film with $NR_5R_6R_7$ in the presence of a base, wherein at least one of $R_5$, $R_6$ and $R_7$ is selected from the group consisting of: $(C_1-C_{10})$alkyleneN$(R_{5'})$$(R_{6'})$, $(C_3-C_8)$cycloalkyleneN$(R_{5'})(R_{6'})$, $(C_1-C_{10})$alkylene$(C_3-C_8)$cycloalkyleneN$(R_{5'})(R_{6'})$, $(C_1-C_{10})$alkylene$(C_3-C_8)$cycloalkylene$(C_1-C_{10})$alkyleneN$(R_{5'})(R_{6'})$, $(C_1-C_{10})$alkylene$(C_6-C_{10})$aryleneN$(R_{5'})(R_{6'})$ and $(C_1-C_{10})$alkylene$(C_6-C_{10})$arylene$(C_1-C_{10})$alkyleneN$(R_{5'})(R_{6'})$;

$R_{5'}$ and $R_{6'}$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl;

the remaining $R_5$, $R_6$ and $R_7$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl; and c) reacting the film from step b) with a tertiary amine of the formula $NR_{5'}R_{6'}R_{7'}$ in the presence of a base; where $R_{5'}$, $R_{6'}$ and $R_{7'}$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl.

As noted, any of the polymer as described herein can be used to make the membranes of this invention. First, the polymer where X is bromine is cast into a suitable film using any of the methods known in the art. The crosslinking of the repeat units can then be made using any of the known methods in the art. Generally, the precursor polymer in the form of a film, where X is a halogen atom is reacted with a multifunctional amino compound to form such crosslinked polymer of this invention. Examples of such multi-functional amino compounds, also sometimes referred to as poly amines, contain two or more amino groups, and may include various bis-amines, tris-amines, tetra-substituted amines, and the like which are well known in the art. Examples of bis-amines include bis-aminoalkanes, bis-aminocycloalkanes, bis-amino-aromatic compounds. Similarly, various tris-aminoalkanes, tris-aminocycloalkanes, tris-amino-aromatic compounds, tetra-substituted-aminoalkanes, tetra-substituted-aminocycloalkanes, tetra-substituted-amino-aromatic compounds, and the like can be employed.

Representative examples of bis-amino compounds, without any limitation, include the following:

N,N,N',N'-tetramethyl-1,2-ethanediamine (TMEDA);
N,N,N',N'-tetraethyl-1,2-ethanediamine (TEEDA);
N,N,N',N'-tetramethyl-1,3-propanediamine (TMPDA);
N,N,N',N'-tetraethyl-1,3-propanediamine (TEPDA);
N,N,N',N'-tetramethyl-1,4-butanediamine (TMBDA);
N,N,N',N'-tetramethyl-1,5-pentanediamine (TMPeDA);
N,N,N',N'-tetramethyl-1,6-hexanediamine (TMHDA);

N,N,N',N'-tetraethyl-1,6-hexanediamine (TEHDA);
N,N-dimehtyl-N',N'-diethyl-1,6-hexanediamine (DMDE-HDA);
N,N,N',N'-tetramethyl-1,8-octanediamine (TMODA);
N,N,N',N'-tetramethyl-1,10-dodecanediamine (TMDDA);
1,4-bis(N,N'-dimethyl)cyclohexane; and
1,4-bis(N,N'-dimethyl)benzene.

Representative examples of various other multifunctional amino compounds, without any limitation, include the following:

$N^1,N^1,N^2,N^2,N^3,N^3$-hexamethylpropane-1,2,3-triamine;
$N^1,N^1,N^3,N^3,N^6,N^6$-hexamethylhexane-1,3,6-triamine;
$N^1,N^1,N^4,N^4,N^8,N^8$-hexamethyloctane-1,4,8-triamine;
$N^1,N^1,N^4,N^4,N^6,N^6,N^8,N^8$-octamethyloctane-1,4,6,8-tetraamine;
$N^1,N^1,N^3,N^3,N^5,N^5$-hexamethylcyclohexane-1,3,5-triamine; and
$N^1,N^1,N^3,N^3,N^5,N^5$-hexamethylbenzene-1,3,5-triamine.

Any of the tertiary amine of the formula $NR_5R_6R_7$, can be used to completely quaternize the membrane of this invention. That is, completely replace the halogen head groups on the polymer chain with a tertiary amine. Representative examples of various tertiary amines, without any limitation, include the following: trimethylamine, triethylamine, tri-n-propylamine, tributylamine, and the like. Various other tertiary amines substituted with suitable cycloalkyl or phenyl groups can also be employed.

By employing aforementioned one or more crosslinkers containing more than two amino functional groups it is now possible to prepare polymers of this invention having various degree of crosslinker concentration varying from at least about two molar percent to fifty molar percent or higher. For example, FIG. 1 illustrates preparation of a bi-functional crosslinked polymer using TMHDA. First, the polymer of this invention is formed into a suitable three-dimensional object such as in a form of a tubular composite, hollow fiber, a dense film flat sheet, or a thin film composite, which are commonly used as membrane materials.

In accordance with the schematic illustration in FIG. 1, a precursor polymer of this invention generally in the form of a film where X is a bromine is reacted with a multifunctional amine as described herein, such as for example, TMHDA to form the crosslinked polymer of this invention having such desirable amount of crosslinking depending upon the intended end use. Such crosslinking reaction can generally be carried out at ambient room temperature conditions in a suitable solvent and generally in alkaline medium, such as for example in the presence of sodium hydroxide. Other suitable bases can also be employed. After completion of the crosslinking reaction the polymer is treated further with a suitable amine to completely replace all of bromine with the amino group. Such suitable amines include trimethylamine, triethylamine and the like. Various other suitable amines can also be employed.

As is apparent from the specific examples that follow, judicious amount of crosslinking of the polymer affords hitherto unattainable properties. For instance, attempts to make membranes without any crosslinking results in membranes which are too delicate and cannot be used as anion exchange membranes. Even more importantly, the ion exchange capacity (IEC) of membranes formed from non-cross linked polymers are generally low and it may even be lower than 3 meq/g. Surprisingly, now it has been found that the membranes made in accordance of this invention are capable of IEC of at least 3 meq/g and generally it ranges from about 3 meq/g to 3.5 meq/g or higher. In some embodiments the membranes made in accordance of this invention are capable of IEC of up to 4 meq/g or higher. In addition, it has further been found that the membranes made in accordance of this invention exhibit very high hydroxide conductivity of more than 200 mS/cm at 80° C. In some embodiments the membranes made in accordance of this invention exhibit hydroxide conductivity in the range of from about 100 mS/cm to about 190 mS/cm at 80° C. Accordingly, in some embodiments the membranes of this invention is capable of IEC of at least 3 meq/g for at least 800 hours at a temperature from about 20° C. to about 100° C. in an aqueous alkaline medium.

Another advantageous property of the membranes of this invention is that they exhibit very high chemical stability especially in an alkaline medium. Accordingly, in some embodiments the membranes of this invention are stable for at least 800 hours at a temperature from about 20° C. to about 100° C. in an aqueous alkaline medium. In some other embodiments the membranes of this invention are stable for 1000 hours at a temperature of about 80° C. in an aqueous alkaline medium.

Accordingly, the membranes of this invention are useful in a variety of applications including electrochemical device, and the like. Accordingly, in one aspect of this invention there is provided an electrochemical device comprising the membrane of this invention. In another embodiment there is further provided a fuel cell comprising the membrane of this invention.

This invention is further illustrated by the following examples which are provided for illustration purposes and in no way limit the scope of the present invention.

EXAMPLES (GENERAL)

The following abbreviations have been used hereinbefore and hereafter in describing some of the compounds, instruments and/or methods employed to illustrate certain of the embodiments of this invention:

NB—norbornene; BuNB—5-butylbicyclo[2.2.1]hept-2-ene; HexNB—5-hexylbicyclo[2.2.1]hept-2-ene; NBPrBr—5-(3-bromopropyl)bicyclo[2.2.1]hept-2-ene; NBBuBr—5-(4-bromobutyl)bicyclo[2.2.1]hept-2-ene; Pd343-(methyl)palladium(tritertbutylphosphine)chloride $(CH_3)Pd(^tBu_3P)Cl$; Pd359-(allyl)palladium(triisopropylphosphine)chloride (($\eta^3$-allyl)Pd($^iPr_3P$)Cl); (crotyl)palladium(tritertbutylphosphine)chloride (crotyl)Pd($^tBu_3P$)Cl; LiFABA—lithium tetrakis(pentafluorophenyl)-borate-(2.5Et$_2$O); TMHDA—N,N,N',N'-tetramethyl-1,6-hexanediamine; TFT—α,α,α-trifluorotoluene; THF—tetrahydrofuran; EtOAc—ethyl acetate; MeOH—methanol; IPA—isopropyl alcohol; ICPOES—inductively coupled plasma atomic emission spectroscopy; GPC—gel permeation chromatography; $M_w$—weight average molecular weight; $M_n$—number average molecular weight; and PDI—polydispersity; NMR—nuclear magnetic resonance spectroscopy; ppm—parts per million; ppb—parts per billion; HPLC—high performance liquid chromatography.

Example 1

Random Copolymer of BuNB/NBBuBr (75:25 Molar Ratio, Designated as GTR75)

In a nitrogen filled glove box, the catalyst solution was prepared by mixing Pd343 and LiFABA in 1:1 molar ratio.

A mixture of toluene and TFT was used as solvents and the mixture was stirred for 20 min to generate the cationic Pd complex which is active for polymerization. The monomers, BuNB and NBBuBr, were taken together in a round-bottomed flask and purified through the three rounds of freeze-pump-thaw cycle. Next, toluene was added to make a 5 wt % solution of the monomers. In a separate round-bottomed flask containing the catalyst solution in toluene, a dropping funnel was mounted on the flask. The monomer solution was added dropwise (10 secs per drop) to the catalyst solution and stirred vigorously. After complete addition, the reaction mixture was taken out and precipitated thrice in methanol. The resulting polymer was dissolved in toluene and stirred over activated charcoal. The solution was passed through an alumina filter to remove any palladium residue. The resulting product was precipitated in methanol. The polymer product was dried under vacuum at 60° C.

Example 2

Homopolymer of NBPrBr (Designated as GT100)

The procedures of Example 1 was substantially repeated in this Example 2 except for using only NBPrBr as the olefinic monomer.

Comparative Example 1

Tetrablock Copolymer
[poly(BuNB-b-NBBuBr-b-BuNB-b-NBBuBr)]

GT75 (BuNB:NBBuBr=25:75 Molar Ratio)

The catalyst was made by dissolving Pd343 (26 mg, 0.074 mmol) and LiFABA (65 mg, 0.074 mmol) in 0.5 g TFT and 0.5 g toluene. BuNB (0.28 g, 1.86 mmol) and toluene (6 mL) were then added and stirred. The catalyst was added under vigorous stirring. The BuNB polymerization reaction was complete in 10 min as checked by GPC. To this was added NBBuBr (1.3 g, 5.6 mmol) and toluene (32 mL) and stirred for 3 h to add the NBBuBr block to the BuNB block. After consumption of NBBuBr, the product was checked by GPC analysis. The third block was formed by adding BuNB (0.28 g, 1.86 mmol) and toluene (6 mL) and allowed to react for 10 min. Finally, NBBuBr (1.3 g, 5.6 mmol) and toluene (32 mL) were added and stirred for 3 h to form the fourth block on the polymer chain. The reaction product was quenched by precipitation in methanol. The polymer was purified over activated charcoal and filtered to remove catalyst residue. The polymer product was precipitated twice in methanol and vacuum dried at 60° C.

Example 3 illustrates the procedure to make the membranes of this invention using any of the polymers described herein. For example, any of the polymers made in accordance with Examples 1-2 can be made into membranes substantially following the procedures of Example 3.

Example 3

Quaternization and Membrane Casting of Polymers of Examples 1-2 and Comparative Example 1

The polymers of Example 1-2 and Comparative Example 1 (0.1 g) were individually taken up in 5 mL of chloroform. In-situ cross-linking was performed by adding a crosslinking agent to the polymer/solvent mixture when the membrane was cast, followed by reaction after casting. The cross-linking agent, TMHDA, was added to the solution at different mole ratios: typically 5 mol %, 10 mol %, 15 mol % and 20 mol %, with respect to the moles of brominated monomer in the polymer (i.e. those monomers which were capable of forming a quaternary ammonium head-group). The cross-linker concentration is based on the mol % TMHDA crosslinker added to the polymer. For example, 5 mol % TMHDA means that up to 10% of the available head-groups are consumed by TMHDA cross-linker, i.e., at least up to 10% of the bromine atoms of the bromobutyl group are replaced by TMHDA. It is noted that even if all the cross-linker were to react, the fraction of intramolecular cross-linking vs. intermolecular cross-linking would be difficult to evaluate. The solution was filtered through a 0.45 µm poly(tetrafluoroethylene) (PTFE) membrane syringe filter and a film was cast and dried at 60° C. for 24 h. The film was colorless, transparent, and flexible. The membranes were further am mated by immersed in 50 wt. % aqueous trimethylamine solution (48 h at room temperature). The quaternized membranes were washed with de-ionized (DI) water. The bromide ions were converted to hydroxide ions by soaking the membranes in 1 M NaOH solution under nitrogen for 24 h.

Hydroxide conductivity: The membrane conductivity was measured using four-point probe electrochemical impedance spectrometry with a PAR 2273 potentiostat. The conductivity of the membranes was measured in HPLC-grade water in a nitrogen atmosphere. The membranes were allowed to sit for 30 min before each measurement. The in-plane ionic conductivity was calculated using Equation 1.

$$\sigma = \frac{L}{WTR} \quad (1)$$

In Eq. 1, σ is the ionic conductivity in S/cm, L is the length between sensing electrodes in cm, W and T are the width and thickness of the membrane in cm, respectively, and R is the resistance measured in Ohms. The long-term (>1000 h) alkaline stability testing was performed by immersing the membrane in 1 M NaOH solution at 80° C. in a teflon-lined Parr reactor. Prior to each measurement, the membranes were taken out of solution and thoroughly washed with DI water. After each measurement, the membranes were stored in the reactors with a freshly prepared NaOH solution. The change in ionic conductivity was used to evaluate the long-term alkaline stability. During measurement, each data point was measured in triplicate and the average value was reported. The deviation in the measurements of each data point was <1%. In addition, the alkaline stability was further analyzed by characterizing the chemical structure using a Nicolet 6700 FT-IR spectrometer.

Ion exchange capacity (IEC), water uptake (WU), number of freezable water ($N_{free}$) and bound, nonfreezable water ($N_{bound}$) molecules, and hydration number (λ): $^1$H NMR was performed on the pre-aminated samples to determine the IEC of the membranes. Further, titration was used to show that the quaternization reaction was quantitative. The titration involved converting the counter anion to chloride, followed by titration of the chloride in the membrane. It was previously found that IEC measurements obtained via $^1$H NMR (pre-aminated samples) and titration (post-aminated samples) were the same (within experimental error). For example, the IEC of the polymer of Example 2 (i.e., PNB—$X_{67}$—$Y_{33}$), was measured by titration and NMR and the results were quite comparable, 1.9 meq/g and 1.92 meq/g, respectively. The fact that they match shows that each bromoalkyl group was quantitatively converted into a quaternary ammonium head-group. That is, each available bromoalkyl group was reacted with trimethyl amine. $^1$H NMR was found to be the more dependable method and IEC data reported herein are from $^1$H NMR measurements. The water uptake of the membranes was calculated using Equation 2.

$$WU(\%) = \frac{M_w - M_d}{M_d} \times 100 \qquad (2)$$

In Eq. 2, $M_d$ is the dry mass and $M_w$ is the wet mass of the membrane after removing surface water. The membranes were measured at room temperature in OH$^-$ form. The number of water molecules per ionic group ($\lambda$), was calculated using Equation 3.

$$\lambda = \frac{1000 \times WU\%}{IEC \times 18} \qquad (3)$$

The number of freezable water ($N_{free}$) and bound water ($N_{bound}$) per ion pair in the membrane was found by differential scanning calorimetry (DSC). DSC measurements were performed with a Discovery DSC with autosampler (TA Instruments). The membranes were hydrated and excess water was removed from the surface. A 5 to 10 mg sample was sealed in a DSC pan. The sample was cooled to −50° C. and then heated to 30° C. at a rate of 5° C./min under N$_2$ (20 mL/min). The amount of freezable and non-freezable water was calculated using Equations 4 to 6.

$$N_{free} = \frac{M_{free}}{M_{tot}} \times \lambda \qquad (4)$$

$M_{free}$ is the mass of freezable water and $M_{tot}$ is the total mass of water in the membrane. The weight fraction of freezable water was calculated using Equation 5.

$$\frac{M_{free}}{M_{tot}} = \frac{H_f / H_{ice}}{(M_W - M_d)/M_W} \qquad (5)$$

$M_w$ is the wet membrane mass and $M_d$ is the dry mass of the membrane. $H_f$ is the enthalpy found by the integration of the DSC freezing peak and $H_{ice}$ is the enthalpy for fusion for water, corrected for the subzero freezing point using Equation 6.

$$H_{ice} = H_{ice}° - \Delta C_p \Delta T_f \qquad (6)$$

$\Delta C_p$ is the difference between the specific heat capacity of liquid water and ice. $\Delta T_f$ is the freezing point depression.

Small angle X-ray scattering (SAXS): SAXS was used to analyze the phase segregation of block copolymer AEMs. Hydrated membranes in bromide form were tested in air using the NSLS-II beamline at the Center for Functional Nanomaterials (Brookhaven National Laboratory, Upton, NY). The wave vector (q) was calculated using Equation 7, where 2θ is the scattering angle.

$$q = \frac{4\pi}{l \sin 2\theta} \qquad (7)$$

The characteristic separation length or inter-domain spacing (d) (i.e. the Bragg spacing) was calculated using Equation 8.

$$d = \frac{2\pi}{q} \qquad (8)$$

The membranes made in accordance of Example 3 derived from polymers of Example 1 and Comparative Example 1 (designated respectively as GTR75-15 and GT75-15) were used for electrochemical testing in an alkaline fuel cell (AEMFC). The anode and cathode were fabricated using the slurry method as described in Kohl, et al., J. Membr. Sci. 2019, 570-571, 394-402. A low molecular weight form of the poly(BuNB-A-NBPrBr-A-BuNB polymer (20.5 kDa) was used as the ionomer. The ionomer and 50% platinum on Vulcan XC-72 catalyst were ground together in isopropanol. The catalyst/ionomer slurry was then sonicated at room temperature to ensure uniform mixing. The slurry was sprayed coated onto 1% water-proofed Toray TGPH-060 carbon paper and allowed to dry at ambient temperature. The platinum loading was 2.1 mg/cm$^2$ and the ionomer-to-carbon ratio was 40%.

The electrode-membrane assembly was soaked in 1 M NaOH for 1.5 h to exchange the bromide for hydroxide. A Fuel Cell Technologies test station with single-pass serpentine graphite plates and PTFE gaskets was used. The tests were performed on a Scribner 850e Fuel Cell Test Station operated at 60° C. using humidified H$_2$ and O$_2$ gases, each at 0.5 L/min. The dew points of the anode and cathode gas streams were adjusted during the experiments.

Table 1 summarizes the results of the ion conductivity measured for polymers of Examples 1-2 and Comparative Example 1 which was crosslinked with various mol % of TMHDA.

TABLE 1

| Crosslinked Polymer | Crosslinker Concentration (mol %) | OH$^-$ Conductivity (mS/cm) 25° C. | OH$^-$ Conductivity (mS/cm) 80° C. | IEC (meq/g) | σ/IEC |
|---|---|---|---|---|---|
| GT100-15 (Example 2) | 15 | 66 | 148 | 4.55 | 32.5 |
| GT100-20 (Example 2) | 20 | 51 | 123 | 4.49 | 27.4 |
| GTR75-5 (Example 1) | 5 | 94 | 194 | 3.58 | 54.2 |
| GTR75-10 (Example 1) | 10 | 77 | 171 | 3.54 | 48.3 |
| GTR75-15 (Example 1) | 15 | 68 | 152 | 3.51 | 43.3 |
| GTR75-20 (Example 1) | 20 | 61 | 132 | 3.48 | 37.9 |
| GT75-5 (Comparative Example 1) | 5 | 99 | 201 | 3.59 | 56.0 |
| GT75-15 (Comparative Example 1) | 15 | 70 | 155 | 3.52 | 44.0 |

It is evident from the data presented in Table 1, it is now possible to fabricate a membrane tailored to desirable ion conducting properties at room temperature to 80° C. That is, by controlling the crosslinking concentration it is now possible to achieve IEC of up to 4.55 meq/g and hydroxide ion conductivity of up to 194 mS/cm at 80° C. It is also evident from the data presented in Table 1 the properties of random polymer and/or the homopolymer is comparable to that of a block copolymer of Comparative Example 1.

Figure 2:
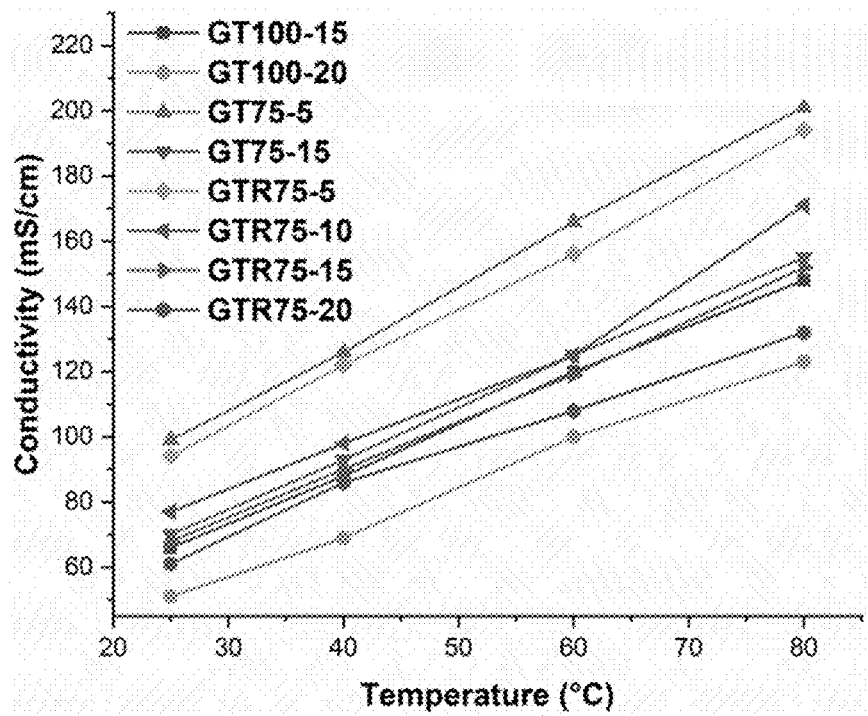
FIG. 2 shows graphical relationship of ionic conductivity at different temperatures of various AEMs made in accordance of this invention which is compared with a cross-linked block copolymer.

Interestingly, cross-linking at higher than 5 mol % seems to decrease the hydroxide ion conductivity. It is also interesting to note from the data summarized in Table 1 that the increase in temperature increases the conductivity of the membranes. This is further illustrated graphically in FIG. 2 where it is clear that the conductivity of all of the membranes studied increase with temperature from 25° C. to 80° C. This phenomenon is due to greater thermal motion of the ions at elevated temperature. A high degree of cross-linking can stabilize polymer membranes and inhibit excess water swelling, but often at the expense of ion mobility. It was observed that the ionic conductivity increased slightly with light cross-linking, 5 mol % cross-linker concentration, and then decreased at higher cross-linking. For GTR75-5 (5 mol % cross-linker concentration), the hydroxide conductivity at 25° C. and 80° C. was 94 mS/cm and 194 mS/cm, respectively. GTR75-20 (20 mol % cross-linker concentration) had lower ionic conductivity: 61 mS/cm and 132 mS/cm at 25° C. and 80° C., respectively. Without cross-linking, the water uptake was so high that stable films could not be made because of excessive swelling.

The hydroxide conductivity normalized by the IEC (σ/IEC) is representative of the hydroxide ion mobility in the membrane. It measures the average effectiveness of the cations within the membrane to contribute to hydroxide conduction. Since the IEC value of each membrane is approximately the same (the only mass change is due to the added cross-linker), the hydroxide mobility tracks with conductivity. The data in Table 1 shows that GT100-15 (polymer of Example 2 with 15 mol % crosslinker concentration) had the highest efficiency whereas, GTR75-20 (polymer of Example 1 with 20 mol % crosslinker concentration) displayed lowest efficiency. Interesting the membranes made from the random polymer of Example 1 or the homopolymer of Example 2 exhibited comparable properties when compared with the similarly crosslinked block copolymer of Comparative Example 1.

Table 2 summarizes the results of the membranes testing for their area specific resistance (ASR), the water uptake vales, hydration number and the degree of quaternization, measured as $N_{free}$ and $N_{bound}$ as well the d-spacing as measured by SAXS.

It is again interesting to note that higher the hydration number higher the conductivity of the membrane. It appears that hydration number of above 10 seems to produce membranes with hitherto unattainable conductivity properties.

The ionic ASR is another key membrane property to determine the effectiveness of the membrane in various applications. Based on the polymer conductivity at 80° C. and membrane thickness, ionic ASR was calculated using the following equation: $ASR=L/\sigma$, where L is the film thickness and σ is the ion conductivity. The ASR of the membrane formed from the 5 mol % crosslinked polymer of Example 2 (GTR75-5) is 0.05 ohm-cm² which is very comparable to the ARPA-E IONICS (Department of Energy, USA) target of <0.04 ohm-cm². The ionic ASR values for the various other membrane samples are summarized in Table 2. It should be noted that membranes having cross-linking less than ten percent are closer to the required ionic ASR target.

Water uptake (WU), hydration number (λ), number of freezable water molecules ($N_{free}$) and bound, non-freezable water molecules ($N_{bound}$) were also measured for each of the membranes made and are summarized in Table 2. For each polymer there is an optimum amount of water uptake needed for ion hydration and efficient channel conduction. Excess water in the form of free water can lead to over swelling of the ion conduction channels and poor performance due to membrane softening and channel flooding. As shown in Table 2, the WU of the membranes had a power law relationship with cross-linker concentration. The best performing membrane, 5 mol % crosslinked polymer of Example 1 (GTR75-5), had 114% WU with a conductivity of 194 mS/cm at 80° C., which is very comparable to the membrane made from the block copolymer of Comparative Example 1 (GT75-5 showed WU of 119% with a conductivity of 201 mS/cm at 80° C.). At a slightly higher cross-linker concentration, 10 mol % crosslinked polymer of Example 1 (GTR75-10), the membrane had slightly lower WU (82%) and also lower conductivity (171 mS/cm at 80° C.). The membrane with the highest measured cross-linker concentration, 20 mol % crosslinked polymer of Example 1 (GTR75-20), had the lowest WU (64%) and also the lowest conductivity (132 mS/cm at 80° C.) due to poor ion mobility.

TABLE 2

| Crosslinked Polymer | Crosslinker Concentration (mol %) | Ionic ASR (Ohm-cm²) | Water Uptake (%) | Hydration number λ | $N_{free}$ | $N_{bound}$ | d-spacing (nm) |
|---|---|---|---|---|---|---|---|
| GT100-15 (Example 2) | 15 | 0.06 | 89 | 10.87 | 1.73 | 9.14 | NA |
| GT100-20 (Example 2) | 20 | 0.06 | 62 | 7.67 | 0.23 | 7.44 | NA |
| GTR75-5 (Example 1) | 5 | 0.05 | 114 | 17.69 | 8.50 | 9.19 | NA |
| GTR75-10 (Example 1) | 10 | 0.05 | 82 | 12.87 | 3.16 | 9.71 | NA |
| GTR75-15 (Example 1) | 15 | 0.06 | 73 | 11.55 | 3.84 | 7.71 | NA |
| GTR75-20 (Example 1) | 20 | 0.08 | 64 | 10.22 | 1.44 | 8.82 | NA |
| GT75-5 (Comparative Example 1) | 5 | 0.05 | 119 | 18.42 | 3.92 | 14.5 | 51.9 |
| GT75-15 (Comparative Example 1) | 15 | 0.06 | 66 | 10.42 | 0.89 | 9.53 | 50.0 |

NA—not applicable.

The number of water molecules per ion pair (head-group and mobile counter ion) and hydration number (λ) can be further parsed into bound or non-freezable ($A_{bound}$) water and unbound or freezable ($N_{free}$) water. The amount of each can be determined in DSC freezing point measurements. As shown in Table 2, the hydration numbers for the samples tested increased with decreasing cross-linker concentration, similar to the WU. The bound water was calculated by subtracting the free water from hydration number. The results of all the membranes are given in Table 2. All of the membrane samples, regardless of their conductivity, had 6 to 7 bound water molecules per ion pair, while the number of free water molecules ranged from 0 to 6.20 per ion pair. The membrane with highest conductivity (GTR75-5, 194 mS/cm at 80° C.) had 8.50 $N_{free}$ water molecules and 9.19 Abound water molecules per ion pair. On the other hand, the poor performing membrane (GTR75-20, 132 mS/cm at 80° C.), had 1.44 $N_{free}$ and 8.82 Abound water molecules per ion pair in the membrane. Again these values were comparable to that measured for a membrane made from a block copolymer (i.e., GT75-5 and GT75-15 of Comparative Example 1).

It should be noted that at high cross-link density, it is increasingly difficult for water molecules, especially free water, to populate the membranes because of the lack of flexibility within the tightly cross-linked membrane. It has been observed that for uncross-linked membranes that had less than 6 free water molecules per ion pair, the conductivity was less than 70 mS/cm. See for example, Kohl, et al., J. Membr. Sci. 2019, 570-571, 394-402. The conductivity of GTR75-20 was low due to low free water. This shows that some free water is essential for channel hydration and high ion mobility. It is also noted that the number of free waters decreased with higher cross-link density, which is likely due to the restricted connectivity between hydrophilic domains. It is also noted that the domain distance was little changed for the samples with different cross-link density. Hence, an optimization of free and bound water molecules in the membranes is necessary to obtaining maximum efficiency.

Figure 3:
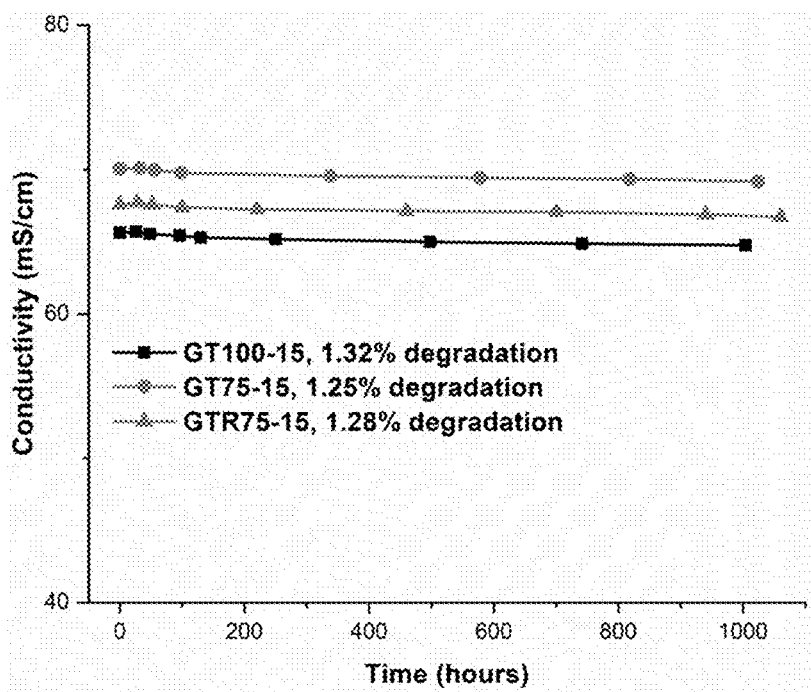
FIG. 3 shows loss of conductivity over a period of time of the AEMs made in accordance of this invention.

The alkaline stability of the membranes of this invention is also important for them to be used in many application as envisioned herein. More specifically, the long-term alkaline resistance of AEMs is a concern, especially for electrochemical devices operating for thousands of hours at high pH and temperature. The stability measurements were performed by soaking the membranes in freshly prepared 1 M NaOH solution at 80° C. for more than 1000 h. The conductivity was measured periodically during the aging process. It was found that the AEMs lost only between 1.25% and 1.32% conductivity over the >1000 h aging period, as shown in FIG. 3. Each data point in FIG. 3 is the average of three individual measurements. There was <1% deviation between the individual measurements of each data point. The three measurements varied only in the third significant figure. This value of conductivity loss is low and acceptable for ARPA-E IONICS targets.

Example 4 illustrates the use of the membranes of this invention in evaluating the performance of a fuel cell. The polymer of Example 1, which was made into a membrane following the procedures as set forth in Example 3 having fifteen mol % crosslinker (designated as GTR75-15) was chosen for demonstration in an alkaline fuel cell. This is compared with the membrane made from the block copolymer of Comparative Example 1 having same fifteen mol % crosslinker (designated as GT75-15).

Example 4

Fuel Cell Performance Testing

The membrane was mechanically robust and easily assembled into the fuel cell hardware. The fuel cell tests were performed at 80° C., which is a common operating temperature. The fuel cell was first conditioned at a cell voltage of 0.5 V for one hour followed by one hour at 0.2 V. After conditioning, the open circuit voltage (OCV) was 1.042 V. A current-voltage voltammogram and impedance spectrum at 0.4 V were periodically recorded. The dew point of the anode and cathode feed gases were set at 52° C. (i.e. 74.8% RH) and 56° C. (i.e. 86.6% RH), respectively.

Figure 4:
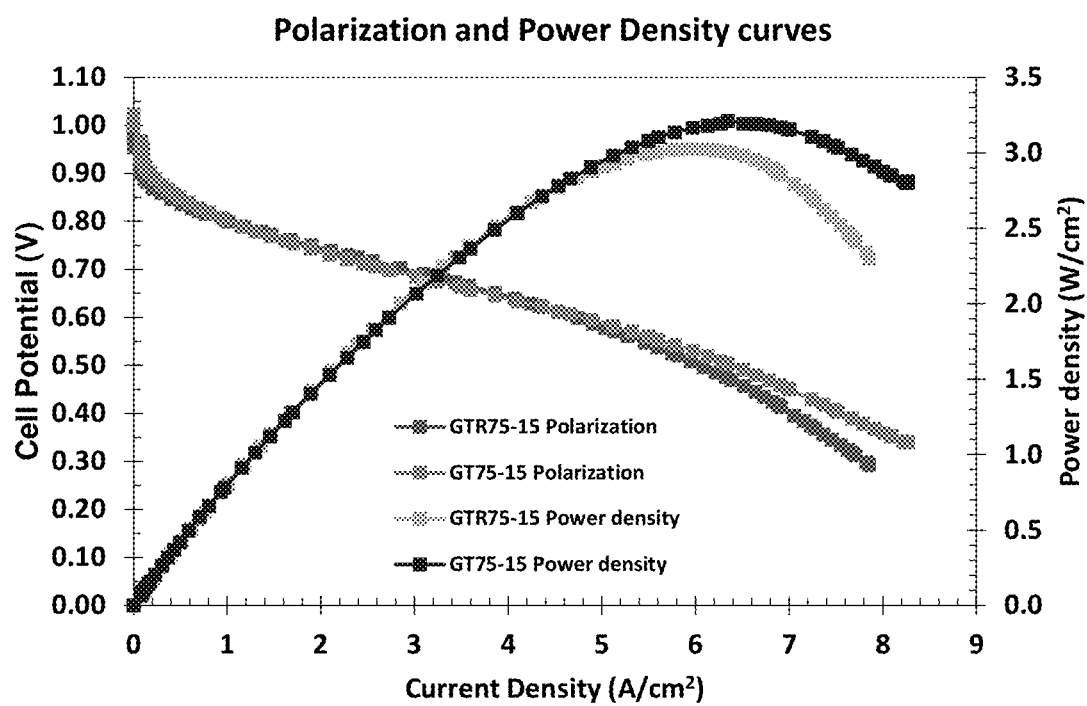
FIG. 4 shows the cell voltage and power as a function of the current density for a hydrogen/oxygen fuel cell operating at 80° C. using an AEM made in accordance of this invention.

FIG. 4 shows the current-voltage and current-power density curves for a 10 μm GTR75-15 AEM, operating with $H_2/O_2$ and 10 μm GT75-15 AEM, operating with $H_2/O_2$, feeds at 1 L/min. The cell temperature was 80° C. The anode/cathode dew points were optimized at 70° C./74° C. for GTR75-15 and 68° C./70° C., for GT75-15. The actual anode loading was 0.672 $mg_{Pt/Ru}$ $cm^{-2}$ and for cathode was 0.584 $mg_{Pt}$ $cm^{-2}$, with no backpressure. These fuel cell results show that the membrane can be successfully integrated into a working electrochemical device.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:
1. A polymer comprising:
a) one or more first repeating unit of formula (IA) derived from a monomer of formula (I):

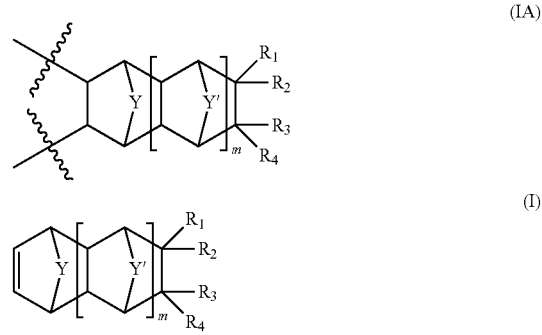

wherein:
∿∿∿ represents a position at which the bonding takes place with another repeat unit;
Y and Y' are the same or different and independently of each other selected from the group consisting of —$CH_2$—, —$CH_2$—$CH_2$— and —O—;
m is an integer from 0 to 3;
at least one of $R_1$, $R_2$, $R_3$ and $R_4$ is a group of the formula R—X,
where R is selected from the group consisting of ($C_1$-$C_{10}$)alkylene, ($C_3$-$C_8$)cycloalkylene, ($C_1$-$C_{10}$)alkylene($C_3$-$C_8$)cycloalkylene, ($C_1$-$C_{10}$)alkylene($C_3$-$C_8$)cycloalkylene($C_1$-$C_{10}$)alkylene, ($C_1$-$C_{10}$)alkylene($C_6$-$C_{10}$)arylene and ($C_1$-$C_{10}$)alkylene($C_6$-$C_{10}$)arylene($C_1$-$C_{10}$)alkylene; and
X is a group of the formula $N(R_5)(R_6)(R_7)^{\oplus}OH^{\ominus}$, where at least one of $R_5$, $R_6$ and $R_7$ is selected from the group consisting of: $(C_1\text{-}C_{10})$alkyleneN$(R_{5'})(R_{6'})$, $(C_3\text{-}C_5)$cycloalkyleneN$(R_{5'})(R_{6'})$, $(C_1\text{-}C_{10})$alkylene$(C_3\text{-}C_8)$cycloalkyleneN$(R_{5'})(R_{6'})$, $(C_1\text{-}C_{10})$alkylene$(C_3\text{-}C_8)$cycloalkylene$(C_1\text{-}C_{10})$alkyleneN$(R_{5'})(R_{6'})$, $(C_1\text{-}C_{10})$alkylene$(C_6\text{-}C_{10})$aryleneN$(R_{5'})(R_{6'})$ and $(C_1\text{-}C_{10})$alkylene$(C_6\text{-}C_{10})$arylene$(C_1\text{-}C_{10})$alkyleneN$(R_{5'})(R_{6'})$; wherein $R_{5'}$ and $R_{6'}$ are the same or different and independently of each other selected from the group consisting of linear or branched $(C_1\text{-}C_{10})$alkyl, $(C_3\text{-}C_8)$cycloalkyl, $(C_1\text{-}C_{10})$alkyl$(C_3\text{-}C_8)$cycloalkyl and $(C_1\text{-}C_{10})$alkyl$(C_6\text{-}C_{10})$aryl;

the remaining $R_5$, $R_6$ and $R_7$ are the same or different and independently of each other selected from the group consisting of linear or branched $(C_1\text{-}C_{10})$alkyl, $(C_3\text{-}C_8)$cycloalkyl, $(C_1\text{-}C_{10})$alkyl$(C_3\text{-}C_8)$cycloalkyl and $(C_1\text{-}C_{10})$alkyl$(C_6\text{-}C_{10})$aryl; and the remaining $R_1$, $R_2$, $R_3$ and $R_4$ are independently of each other selected from the group consisting of hydrogen, linear or branched $(C_1\text{-}C_{10})$alkyl, $(C_3\text{-}C_8)$cycloalkyl, $(C_1\text{-}C_{10})$alkyl$(C_3\text{-}C_8)$cycloalkyl and $(C_1\text{-}C_{10})$alkyl$(C_6\text{-}C_{10})$aryl;

b) one or more second repeating unit of formula (IIA) derived from a monomer of formula (II):

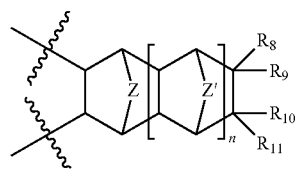

(IIA)

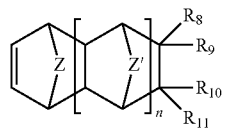

(II)

wherein:

⌇⌇⌇ represents a position at which the bonding takes place with another repeat unit;

Z and Z' are the same or different and independently of each other selected from the group consisting of —$CH_2$—, —$CH_2$—$CH_2$— and —O—;

n is an integer from 0 to 3; and $R_8$, $R_9$, $R_{10}$ and $R_{11}$ are the same or different and independently of each other selected from the group consisting of hydrogen, linear or branched $(C_1\text{-}C_{10})$alkyl, $(C_3\text{-}C_8)$cycloalkyl, $(C_1\text{-}C_{10})$alkyl$(C_3\text{-}C_8)$cycloalkyl and $(C_1\text{-}C_{10})$alkyl$(C_6\text{-}C_{10})$aryl; and wherein the polymer is a random polymer and wherein the first repeat unit is crosslinked with another first repeat unit on the same or different polymer chains such that the polymer has at least two percent of the available sites reacted between the repeat units and exhibits ion conductivity of at least 150 mS/cm at 80° C.

2. The polymer according to claim 1, wherein
m and n are 0 or 1;
each of Y, Y', Z and Z' is $CH_2$;
R is $(CH_2)_a$, $(CH_2)_a$cyclohexylene, $(CH_2)_a$cyclohexylene$(CH_2)_a$, $(CH_2)_a$phenylene, and $(CH_2)_a$phenylene$(CH_2)_a$, where a is an integer from 1 to 10;

at least one of $R_5$, $R_6$ and $R_7$ is selected from the group consisting of:
$(CH_2)_a$N$R_{5'},R_{6'}$, $(CH_2)_a$cyclohexyleneN$R_5R_{6'}$, $(CH_2)_a$cyclohexylene$(CH_2)_a$N$R_5R_{6'}$, $(CH_2)_a$phenyleneN$R_5R_{6'}$, and $(CH_2)_a$phenylene$(CH_2)_a$N$R_5R_{6'}$, where a is an integer from 1 to 10;

$R_{5'}$ and $R_{6'}$ are the same or different and independently of each other selected from the group consisting of methyl, ethyl, linear or branched propyl, butyl, pentyl, hexyl, cyclopentyl, cyclohexyl, methylcyclopentyl, methylcyclohexyl and benzyl;

the remaining $R_5$, $R_6$ and $R_7$ are the same or different and independently of each other selected from the group consisting of methyl, ethyl, linear or branched propyl, butyl, pentyl, hexyl, cyclopentyl, cyclohexyl, methylcyclopentyl, methylcyclohexyl and benzyl;

the remaining $R_1$, $R_2$, $R_3$ and $R_4$ are independently of each other selected from the group consisting of hydrogen, methyl, ethyl, linear or branched propyl, butyl, pentyl, hexyl, cyclopentyl, cyclohexyl, methylcyclopentyl, methylcyclohexyl and benzyl; and $R_8$, $R_9$, $R_{10}$ and $R_{11}$ are independently of each other selected from the group consisting of hydrogen, methyl, ethyl, linear or branched propyl, butyl, pentyl, hexyl, cyclopentyl, cyclohexyl, methylcyclopentyl, methylcyclohexyl and benzyl.

3. The polymer according to claim 1, wherein the first repeat unit is crosslinked with another first repeat unit such that the polymer is having a crosslinking between the repeat units of two percent or more to ten percent or less.

4. A polymer comprising:
a) one or more repeating unit of formula (IA) derived from a monomer of formula (I):

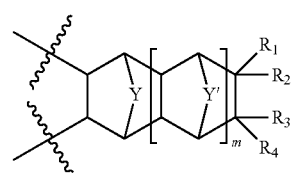

(IA)

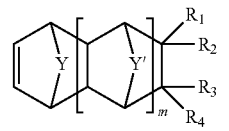

(I)

wherein:

⌇⌇⌇ represents a position at which the bonding takes place with another repeat unit;

Y and Y' are the same or different and independently of each other selected from the group consisting of —$CH_2$—, —$CH_2$—$CH_2$— and —O—;

m is an integer from 0 to 3;

at least one of $R_1$, $R_2$, $R_3$ and $R_4$ is a group of the formula R—X, where R is selected from the group consisting of $(C_1\text{-}C_{10})$alkylene, $(C_3\text{-}C_8)$cycloalkylene, $(C_1\text{-}C_{10})$alkylene$(C_3\text{-}C_8)$cycloalkylene, $(C_1\text{-}C_{10})$alkylene$(C_3\text{-}C_8)$cycloalkylene$(C_1\text{-}C_{10})$alkylene, $(C_1\text{-}C_{10})$alkylene$(C_6\text{-}C_{10})$arylene and $(C_1\text{-}C_{10})$alkylene$(C_6\text{-}C_{10})$arylene$(C_1\text{-}C_{10})$alkylene; and X is a group of the formula N$(R_5)(R_6)(R_7)^{\oplus}$OH$^{\ominus}$, where at least one of $R_5$, $R_6$ and $R_7$ is selected from the group consisting of: $(C_1\text{-}C_{10})$alkyleneN$(R_{5'})(R_{6'})$, $(C_3\text{-}C_8)$cycloalkyleneN(R$_{5'}$)(R$_{6'}$), (C$_1$-C$_{10}$)alkylene(C$_3$-C$_8$)cycloalkyleneN(R$_{5'}$)(R$_{6'}$), (C$_1$-C$_{10}$)alkylene(C$_3$-C$_8$)cycloalkylene(C$_1$-C$_{10}$)alkyleneN(R$_{5'}$)(R$_{6'}$), (C$_1$-C$_{10}$)alkylene(C$_6$-C$_{10}$)aryleneN(R$_{5'}$)(R$_{6'}$) and (C$_1$-C$_{10}$)alkylene(C$_6$-C$_{10}$)arylene(C$_1$-C$_{10}$)alkyleneN(R$_{5'}$)(R$_{6'}$);

R$_{5'}$ and R$_{6'}$ are the same or different and independently of each other selected from the group consisting of linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl;

the remaining R$_5$, R$_6$ and R$_7$ are the same or different and independently of each other selected from the group consisting of linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl; and the remaining R$_1$, R$_2$, R$_3$ and R$_4$ are independently of each other selected from the group consisting of hydrogen, linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl; and wherein the polymer is a random polymer when it contains more than one distinct repeat unit of formula (IA) and the repeat unit is crosslinked with another repeat unit on the same or different polymer chains such that the polymer has at least two percent of the available sites reacted between the repeat units and exhibits ion conductivity of at least 150 mS/cm at 80° C.

5. The polymer according to claim 4, wherein the polymer is a homopolymer.

6. An anion exchange membrane comprising the polymer of claim 4.

7. The polymer according to claim 1, wherein the polymer is a random copolymer containing one first repeat unit of formula (IA) derived from a monomer of formula (I) and one second repeat unit of formula (IIA) derived from a monomer of formula (II).

8. The polymer according to claim 1, wherein the second repeat unit of formula (IIA) is derived from a monomer of formula (II) selected from the group consisting of:

bicyclo-
[2.2.1]-
hept-2-ene
(NB)

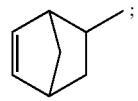

5-methylbicyclo-
[2.2.1]hept-2-ene
(MeNB)

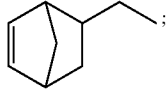

5-ethylbicyclo-
[2.2.1]hept-2-ene
(EtNB)

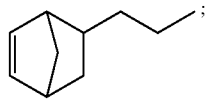

5-propylbicyclo[2.2.1]-
hept-2-ene (PrNB)

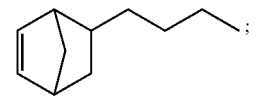

5-butylbicyclo[2.2.1]hept-2-ene
(BuNB)

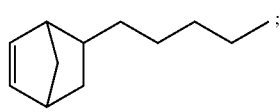

5-pentylbicyclo[2.2.1]hept-2-ene
(PenBN)

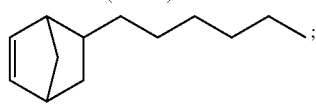

5-hexylbicyclo[2.2.1]hept-2-ene
(HexNB)

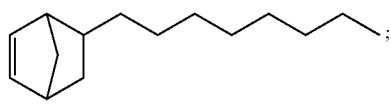

5-octylbicyclo[2.2.1]hept-2-ene (OctNB)

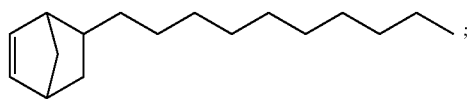

5-decylbicyclo[2.2.1]hept-2-ene (DecNB)

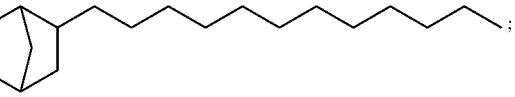

5-dodecylbicyclo[2.2.1]hept-2-ene (DoDecNB)

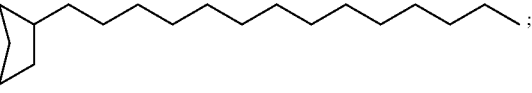

5-tetradecylbicyclo[2.2.1]hept-2-ene (TetraDecNB)

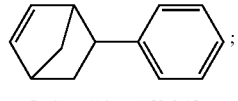

5-phenylbicyclo[2.2.1]-
hept-2-ene (PhNB)

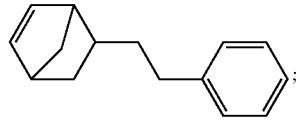

5-phenethylbicyclo[2.2.1]-
hept-2-ene (PENB)

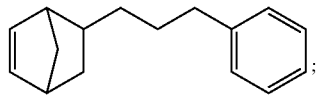

5-(3-phenylpropyl)bicyclo[2.2.1]-
hept-2-ene

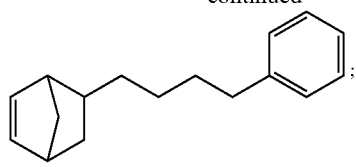

5-(4-phenylbutyl)bicyclo[2.2.1]hept-2-ene

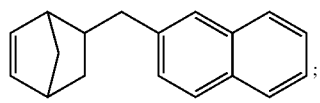

2-(bicyclo[2.2.1]hept-5-en-2-ylmethyl)-
naphthalene

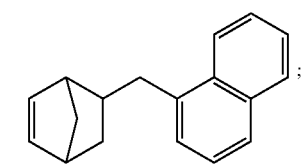

1-(bicyclo[2.2.1]hept-5-en-2-ylmethyl)-
naphthalene

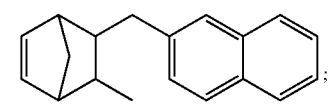

2-((3-methylbicyclo[2.2.1]hept-5-en-2-yl)-
methyl)naphthalene

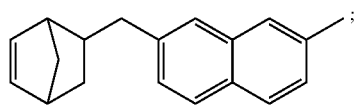

2-(bicyclo[2.2.1]hept-5-en-2-ylmethyl)-7-
methylnaphthalene

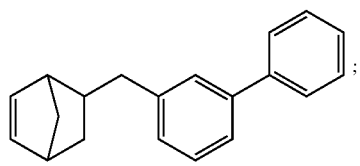

5-([1,1'-biphenyl]-3-ylmethyl)bicyclo-
[2.2.1]hept-2-ene

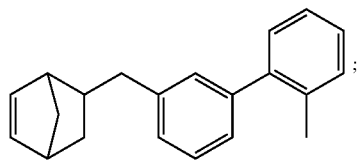

5-((2'-methyl-[1,1'-biphenyl]-3-yl)-
methyl)bicyclo[2.2.1]hept-2-ene

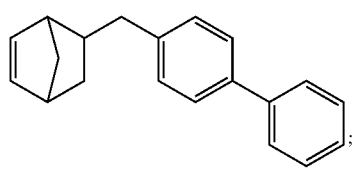

5-([1,1'-biphenyl]-4-ylmethyl)bicyclo-
[2.2.1]hept-2-ene

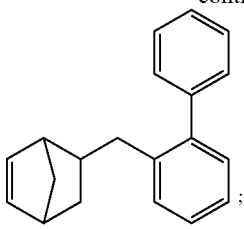

5-([1,1'-biphenyl]-2-ylmethyl)-
bicyclo[2.2.1]hept-2-ene

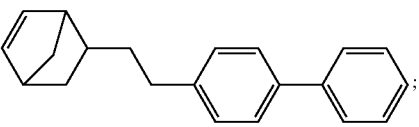

5-(2-([1,1'-biphenyl]-4-
yl)ethyl)bicyclo[2.2.1]-
hept-2-ene (NBEtPhPh)

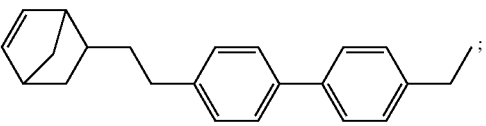

5-(2(4'-ethyl-[1,1'-biphenyl]-4-yl)ethyl)bicyclo-
[2.2.1]hept-2-ene

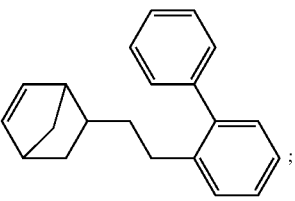

5-(2([1,1'-biphenyl]-2-yl)ethyl)-
bicyclo[2.2.1]hept-2-ene

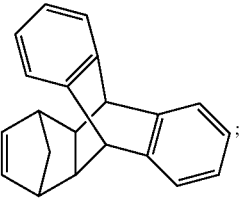

(9R,10S,11R,12S)-9,10-
dihydro-9,10[2]-
bicycloanthracene

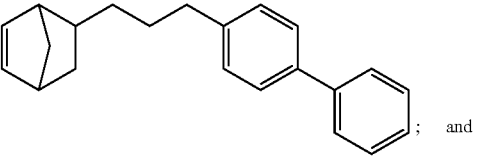

; and 5-(3-([1,1'-biphenyl]-4-yl)propyl)bicyclo[2.2.1]-
hept-2-ene

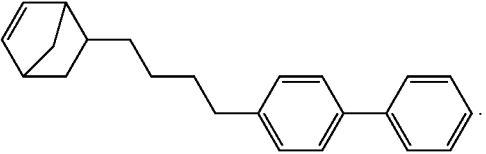

5-(4-([1,1'-biphenyl]-4-yl)butyl)bicyclo[2.2.1]hept-2-ene

9. The polymer according to claim 1, which is selected from the group consisting of:

a polymer formed from 5-(3-bromopropyl)bicyclo[2.2.1]
hept-2-ene (NBPrBr) and norbornene (NB) and N,N,
N',N'-tetramethyl-1,6-hexanediamine (TMHDA);

a polymer formed from 5-(4-bromobutyl)bicyclo[2.2.1]
hept-2-ene (NBBuBr), norbornene (NB) and N,N,N',
N'-tetramethyl-1,6-hexanediamine (TMHDA);

a polymer formed from 5-(4-bromobutyl)bicyclo[2.2.1]
hept-2-ene (NBBuBr) and 5-ethylbicyclo[2.2.1]hept-2-
ene (EtNB) and N,N,N',N'-tetramethyl-1,6-hexanedi-
amine (TMHDA);

a polymer formed from 5-(4-bromobutyl)bicyclo[2.2.1]
hept-2-ene (NBBuBr) and 5-propylbicyclo[2.2.1]hept-
2-ene (PrNB) and N,N,N',N'-tetramethyl-1,6-hexanedi-
amine (TMHDA);

a polymer formed from 5-(4-bromobutyl)bicyclo[2.2.1]
hept-2-ene (NBBuBr), 5-ethylbicyclo[2.2.1]hept-2-ene
(EtNB) and N,N,N',N'-tetramethyl-1,6-hexanediamine
(TMHDA);

a polymer formed from 5-(4-bromopropyl)bicyclo[2.2.1]
hept-2-ene (NBPrBr), 5-butylbicyclo[2.2.1]hept-2-ene
(BuNB) and N,N,N',N'-tetramethyl-1,6-hexanediamine
(TMHDA);

a polymer formed from 5-(4-bromobutyl)bicyclo[2.2.1]
hept-2-ene (NBBuBr), 5-butylbicyclo[2.2.1]hept-2-ene
(BuNB) and N,N,N',N'-tetramethyl-1,6-hexanediamine
(TMHDA); and a polymer formed from 5-(4-bromobutyl)bicyclo[2.2.1]
hept-2-ene (NBBuBr), 5-hexylbicyclo[2.2.1]hept-2-
ene (HexNB) and N,N,N',N'-tetramethyl-1,6-hexanedi-
amine (TMHDA).

10. An anion exchange membrane comprising a random polymer having:

a) one or more first repeating unit of formula (IA) derived from a monomer of formula (I):

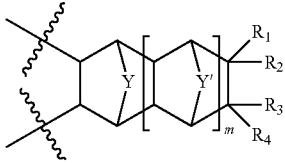

(IA)

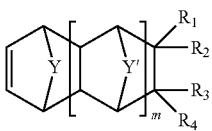

(I)

wherein:

∼∼∼ represents a position at which the bonding takes place with another repeat unit;

Y and Y' are the same or different and independently of each other selected from the group consisting of —CH$_2$—, —CH$_2$—CH$_2$— and —O—;

m is an integer from 0 to 3;

at least one of $R_1$, $R_2$, $R_3$ and $R_4$ is a group of the formula R—X, where R is selected from the group consisting of (C$_1$-C$_{10}$)alkylene, (C$_3$-C$_8$)cycloalkylene, (C$_1$-C$_{10}$)alkylene(C$_3$-C$_8$)cycloalkylene, (C$_1$-C$_{10}$)alkylene(C$_3$-C$_8$)cycloalkylene(C$_1$-C$_{10}$)alkylene, (C$_1$-C$_{10}$)alkylene(C$_6$-C$_{10}$)arylene and (C$_1$-C$_{10}$)alkylene(C$_6$-C$_{10}$)arylene(C$_1$-C$_{10}$)alkylene; and X is a group of the formula N(R$_5$)(R$_6$)(R$_7$)$^\oplus$OH$^\ominus$, where at least one of R$_5$, R$_6$ and R$_7$ is selected from the group consisting of:

(C$_1$-C$_{10}$)alkyleneN(R$_{5'}$)(R$_{6'}$), (C$_3$-C$_8$)cycloalkyleneN(R$_{5'}$)(R$_{6'}$), (C$_1$-C$_{10}$)alkylene(C$_3$-C$_8$)cycloalkyleneN(R$_{5'}$)(R$_{6'}$), (C$_1$-C$_{10}$)alkylene(C$_3$-C$_8$)cycloalkylene(C$_1$-C$_{10}$)alkyleneN(R$_{5'}$)(R$_{6'}$), (C$_1$-C$_{10}$)alkylene(C$_6$-C$_{10}$)aryleneN(R$_{5'}$)(R$_{6'}$) and (C$_1$-C$_{10}$)alkylene(C$_6$-C$_{10}$)arylene(C$_1$-C$_{10}$)alkyleneN(R$_{5'}$)(R$_{6'}$);

R$_{5'}$ and R$_{6'}$ are the same or different and independently of each other selected from the group consisting of linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl;

the remaining R$_5$, R$_6$ and R$_7$ are the same or different and independently of each other selected from the group consisting of linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl; and the remaining R$_1$, R$_2$, R$_3$ and R$_4$ are independently of each other selected from the group consisting of hydrogen, linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl;

b) one or more second repeating unit of formula (IIA) derived from a monomer of formula (II):

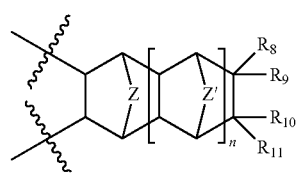

(IIA)

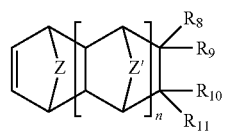

(II)

wherein:

∼∼∼ represents a position at which the bonding takes place with another repeat unit;

Z and Z' are the same or different and independently of each other selected from the group consisting of —CH$_2$—, —CH$_2$—CH$_2$— and —O—;

n is an integer from 0 to 3; and

R$_8$, R$_9$, R$_{10}$ and R$_{11}$ are the same or different and independently of each other selected from the group consisting of hydrogen, linear or branched (C$_1$-C$_{10}$)alkyl, (C$_3$-C$_8$)cycloalkyl, (C$_1$-C$_{10}$)alkyl(C$_3$-C$_8$)cycloalkyl and (C$_1$-C$_{10}$)alkyl(C$_6$-C$_{10}$)aryl; and wherein the first repeat unit is crosslinked with another first repeat unit on the same or different polymer chains such that the polymer is having a crosslinking of at least two percent between the repeat units and exhibits ion conductivity of at least 150 mS/cm at 80° C.

11. The membrane according to claim 10 in a form of a tubular composite, hollow fiber, a dense film flat sheet, or a thin film composite.

12. The membrane according to claim 10, which is capable of ion exchange capacity of at least 3 meq/g for at least 800 hours at a temperature from about 20° C. to about 100° C. in an aqueous alkaline medium.

13. An electrochemical device comprising the membrane according to claim 10.

14. A fuel cell comprising the membrane according to claim 10.

15. The membrane according to claim 10, wherein the polymer is a copolymer containing one first repeat unit of formula (IA) derived from a monomer of formula (I) and one second repeat unit of formula (IIA) derived from a monomer of formula (II).

16. The membrane according to claim 10, wherein the polymer is a terpolymer containing two distinct first repeat units of formula (IA) derived from two distinct monomers of formula (I) and one second repeat unit of formula (IIA) derived from a monomer of formula (II).

17. The membrane according to claim 10, wherein the polymer is selected from the group consisting of:
- a polymer formed from 5-(4-bromobutyl)bicyclo[2.2.1]hept-2-ene (NBBuBr), norbornene (NB) and N,N,N',N'-tetramethyl-1,6-hexanediamine (TMHDA);
- a polymer formed from 5-(4-bromobutyl)bicyclo[2.2.1]hept-2-ene (NBBuBr), 5-ethylbicyclo[2.2.1]hept-2-ene (EtNB) and N,N,N',N'-tetramethyl-1,6-hexanediamine (TMHDA);
- a polymer formed from 5-(4-bromobutyl)bicyclo[2.2.1]hept-2-ene (NBBuBr), 5-butylbicyclo[2.2.1]hept-2-ene (BuNB) and N,N,N',N'-tetramethyl-1,6-hexanediamine (TMHDA);
- a polymer formed from 5-(4-bromobutyl)bicyclo[2.2.1]hept-2-ene (NBBuBr), 5-hexylbicyclo[2.2.1]hept-2-ene (HexNB) and N,N,N',N'-tetramethyl-1,6-hexanediamine (TMHDA); and
- a polymer formed from 5-(4-bromopropyl)bicyclo[2.2.1]hept-2-ene (NBPrBr), 5-butylbicyclo[2.2.1]hept-2-ene (BuNB) and N,N,N',N'-tetramethyl-1,6-hexanediamine (TMHDA).

18. A method for the formation of a membrane according to claim 10 comprising:
  a) casting a film of a polymer according to claim 10, wherein X is bromine;
  b) reacting the film with $NR_5R_6R_7$ in the presence of a base, wherein at least one of $R_5$, $R_6$ and $R_7$ is selected from the group consisting of:
  $(C_1-C_{10})$alkyleneN$(R_{5'})(R_{6'})$, $(C_3-C_8)$cycloalkyleneN$(R_{5'})(R_{6'})$, $(C_1-C_{10})$alkylene$(C_3-C_8)$cycloalkyleneN$(R_{5'})(R_{6'})$, $(C_1-C_{10})$alkylene$(C_3-C_8)$cycloalkylene$(C_1-C_{10})$alkyleneN$(R_{5'})(R_{6'})$, $(C_1-C_{10})$alkylene$(C_6-C_{10})$aryleneN$(R_{5'})(R_{6'})$ and $(C_1-C_{10})$alkylene$(C_6-C_{10})$arylene$(C_1-C_{10})$alkyleneN$(R_{5'})(R_{6'})$;
  $R_{5'}$ and $R_{6'}$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl;
  the remaining $R_5$, $R_6$ and $R_7$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl; and
  c) reacting the film from step b) with a tertiary amine of the formula $NR_{5'}R_{6'}R_{7'}$ in the presence of a base; where $R_{5'}$, $R_{6'}$ and $R_{7'}$ are the same or different and independently of each other selected from the group consisting of linear or branched $(C_1-C_{10})$alkyl, $(C_3-C_8)$cycloalkyl, $(C_1-C_{10})$alkyl$(C_3-C_8)$cycloalkyl and $(C_1-C_{10})$alkyl$(C_6-C_{10})$aryl.

19. The method according to claim 18, wherein the base is an alkaline base.

* * * * *